(12) United States Patent
Spiteri

(10) Patent No.: US 11,972,579 B1
(45) Date of Patent: *Apr. 30, 2024

(54) SYSTEM, METHOD AND APPARATUS FOR OBJECT TRACKING AND HUMAN POSE ESTIMATION

(71) Applicant: TOCA Football, Inc., Costa Mesa, CA (US)

(72) Inventor: Conrad Spiteri, Thames Ditton (GB)

(73) Assignee: TOCA Football, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,834

(22) Filed: Nov. 28, 2022

Related U.S. Application Data

(63) Continuation of application No. 16/993,030, filed on Aug. 13, 2020, now Pat. No. 11,514,590.

(51) Int. Cl.
*G06T 7/292* (2017.01)
*G06T 7/246* (2017.01)
(Continued)

(52) U.S. Cl.
CPC ............ *G06T 7/292* (2017.01); *G06T 7/248* (2017.01); *G06T 7/70* (2017.01); *G06V 40/23* (2022.01);
(Continued)

(58) Field of Classification Search
CPC G06T 7/292; G06T 7/248; G06T 7/70; G06T 2207/30228
(Continued)

(56) References Cited

U.S. PATENT DOCUMENTS 2,440,274 A    4/1948   Ibisch
3,913,552 A    10/1975   Yarur et al.
(Continued)

FOREIGN PATENT DOCUMENTS

AU    2005248763 B2    6/2010
CA       2476010 A1    1/2005
(Continued)

OTHER PUBLICATIONS

U.S. Appl. No. 16/993,035, filed Aug. 13, 2020 Notice of Allowance dated Mar. 7, 2023.
(Continued)

*Primary Examiner* — Ayodeji O Ayotunde
(74) *Attorney, Agent, or Firm* — Rutan & Tucker, LLP; Kyle M. St. James

(57) ABSTRACT

Disclosed herein is a system and method directed to object tracking using plurality of cameras. The system includes the plurality of cameras disposed around a playing surface in a mirrored configuration, and where the plurality of cameras are time-synchronized. The system further includes logic that, when executed by a processor, causes performance of operations including: obtaining a sequence of images from the plurality of cameras, continuously detecting an object in image pairs at successive points in time, wherein each image pair corresponds to a single point in time, continuously determining a location of the object within the playing space through triangulation of the object within each image pair, determining wall coordinates of a wall that the object is expected to contact based on the continuously determined location of the object and causing rendering of a visual graphic based on the wall coordinates.

20 Claims, 11 Drawing Sheets

(51) Int. Cl.
 *G06T 7/70* (2017.01)
 *G06V 40/20* (2022.01)
(52) U.S. Cl.
 CPC .............. *G06T 2207/30196* (2013.01); *G06T 2207/30224* (2013.01); *G06T 2207/30228* (2013.01); *G06T 2207/30241* (2013.01)
(58) Field of Classification Search
 USPC ........................................................ 382/103
 See application file for complete search history.

(56) References Cited

U.S. PATENT DOCUMENTS

| | | |
|---|---|---|
| 3,918,711 A | 11/1975 | Zak |
| 3,989,246 A | 11/1976 | Brown et al. |
| 4,025,071 A | 5/1977 | Hodges |
| 4,029,315 A | 6/1977 | Bon |
| 4,150,825 A | 4/1979 | Wilson |
| 4,442,823 A | 4/1984 | Floyd et al. |
| 4,535,992 A | 8/1985 | Slagle |
| 4,645,458 A | 2/1987 | Williams |
| 4,726,616 A | 2/1988 | Schmidt |
| 4,751,642 A | 6/1988 | Silva et al. |
| 4,882,676 A | 11/1989 | Van De Kop et al. |
| 4,915,384 A | 4/1990 | Bear |
| 4,919,428 A | 4/1990 | Perkins |
| 5,107,820 A | 4/1992 | Salansky |
| 5,125,653 A | 6/1992 | Kovacs et al. |
| 5,188,367 A | 2/1993 | Gipe et al. |
| 5,264,765 A | 11/1993 | Pecorino et al. |
| 5,342,041 A | 8/1994 | Agulnek et al. |
| 5,344,137 A | 9/1994 | Komori |
| 5,359,986 A | 11/1994 | Magrath, III et al. |
| 5,361,455 A | 11/1994 | Kiefer |
| 5,365,427 A | 11/1994 | Soignet et al. |
| 5,438,518 A | 8/1995 | Bianco et al. |
| 5,447,314 A | 9/1995 | Yamazaki et al. |
| 5,464,208 A | 11/1995 | Pierce |
| 5,465,978 A | 11/1995 | Magnone et al. |
| 5,489,099 A | 2/1996 | Rankin et al. |
| 5,490,493 A | 2/1996 | Salansky |
| 5,498,000 A | 3/1996 | Cuneo |
| 5,529,205 A | 6/1996 | Corney et al. |
| 5,556,106 A | 9/1996 | Jurcisin |
| 5,649,523 A | 7/1997 | Scott |
| 5,683,302 A | 11/1997 | Harrell et al. |
| 5,697,791 A | 12/1997 | Nashner et al. |
| 5,722,384 A | 3/1998 | Cox |
| 5,768,151 A | 6/1998 | Lowy et al. |
| 5,860,873 A | 1/1999 | Karasavas |
| 5,868,578 A | 2/1999 | Baum |
| 5,873,797 A | 2/1999 | Garn |
| 5,882,204 A | 3/1999 | Iannazo et al. |
| 5,897,445 A | 4/1999 | Sanders |
| 5,911,214 A | 6/1999 | Andrews |
| 5,938,545 A | 8/1999 | Cooper et al. |
| 6,042,492 A | 3/2000 | Baum |
| 6,073,489 A | 6/2000 | French et al. |
| 6,082,350 A | 7/2000 | Crews et al. |
| 6,098,458 A | 8/2000 | French et al. |
| 6,179,720 B1 | 1/2001 | Rankin et al. |
| 6,182,649 B1 | 2/2001 | Battersby et al. |
| 6,190,271 B1 | 2/2001 | Rappaport et al. |
| 6,237,583 B1 | 5/2001 | Ripley et al. |
| 6,263,279 B1 | 7/2001 | Bianco et al. |
| 6,308,565 B1 | 10/2001 | French et al. |
| 6,320,173 B1 | 11/2001 | Vock et al. |
| 6,533,675 B2 | 3/2003 | Funk |
| 6,539,931 B2 | 4/2003 | Trajkovic et al. |
| 6,565,448 B2 | 5/2003 | Cameron et al. |
| 6,707,487 B1 | 3/2004 | Aman et al. |
| 6,774,349 B2 | 8/2004 | Vock et al. |
| 6,816,185 B2 | 11/2004 | Harmath |
| 7,040,998 B2 | 5/2006 | Jolliffe et al. |
| 7,082,938 B2 | 8/2006 | Wilmot |
| 7,100,791 B2 | 9/2006 | Berger |
| 7,335,116 B2 | 2/2008 | Petrov |
| 7,559,163 B2 | 7/2009 | Ofuji et al. |
| 7,610,909 B2 | 11/2009 | Greene, Jr. |
| 7,815,525 B2 | 10/2010 | Small |
| 7,850,536 B1 | 12/2010 | Fitzgerald |
| 7,882,831 B2 | 2/2011 | Alger |
| 7,920,052 B2 | 4/2011 | Costabile |
| 8,142,267 B2 | 3/2012 | Adams |
| 8,164,830 B2 | 4/2012 | Astill |
| 8,210,959 B2 | 7/2012 | Balardeta et al. |
| 8,292,733 B2 | 10/2012 | Crawford et al. |
| 8,444,499 B2 | 5/2013 | Balardeta et al. |
| 8,597,142 B2 | 12/2013 | Mayles et al. |
| 8,617,008 B2 | 12/2013 | Marty et al. |
| 8,705,799 B2 | 4/2014 | White et al. |
| 8,840,483 B1 | 9/2014 | Steusloff et al. |
| 8,893,698 B2 | 11/2014 | Boehner |
| 8,992,346 B1 | 3/2015 | Raposo |
| 9,010,309 B2 | 4/2015 | Lewis et al. |
| 9,017,188 B2 | 4/2015 | Joseph et al. |
| 9,050,519 B1 | 6/2015 | Ehlers et al. |
| 9,162,134 B2 | 10/2015 | Schwartz |
| 9,216,330 B2 | 12/2015 | Beck et al. |
| 9,233,292 B2 | 1/2016 | Joseph et al. |
| 9,469,945 B2 | 10/2016 | Khurgin |
| 9,586,099 B2 | 3/2017 | Holthouse |
| 9,616,346 B2 | 4/2017 | Nicora et al. |
| 9,625,321 B2 | 4/2017 | Cavallaro et al. |
| 9,724,584 B1 | 8/2017 | Campbell et al. |
| 9,782,648 B2 | 10/2017 | DeCarlo |
| 9,901,776 B2 | 2/2018 | Mettler |
| 9,901,804 B2 | 2/2018 | Vollbrecht et al. |
| 9,968,837 B2 | 5/2018 | Johnston |
| 9,999,823 B2 | 6/2018 | Chen et al. |
| 10,092,793 B1 | 10/2018 | Marty et al. |
| 10,300,361 B2 | 5/2019 | Khazanov et al. |
| 10,360,685 B2 | 7/2019 | Marty et al. |
| 10,380,409 B2 | 8/2019 | Thornbrue et al. |
| 10,398,957 B2 | 9/2019 | Altshuler et al. |
| 10,456,645 B2 | 10/2019 | Joo et al. |
| 10,486,024 B2 | 11/2019 | Joo et al. |
| 10,486,043 B2 | 11/2019 | Joo et al. |
| 10,489,656 B2 | 11/2019 | Lee et al. |
| 10,600,334 B1 | 3/2020 | Zhang et al. |
| 10,653,936 B2 | 5/2020 | Ganzer |
| 10,695,637 B2 | 6/2020 | Hennessy et al. |
| 10,974,121 B2 | 4/2021 | Thornbrue et al. |
| 11,207,582 B2 | 12/2021 | Lewis et al. |
| 11,514,590 B2 * | 11/2022 | Spiteri .................. G06V 40/23 |
| 2002/0148455 A1 | 10/2002 | Trajkovic et al. |
| 2003/0008731 A1 | 1/2003 | Anderson et al. |
| 2003/0092497 A1 | 5/2003 | Holcomb |
| 2003/0109322 A1 | 6/2003 | Funk et al. |
| 2003/0142210 A1 | 7/2003 | Carlbom et al. |
| 2003/0195052 A1 | 10/2003 | Cohen et al. |
| 2004/0058749 A1 | 3/2004 | Pirritano et al. |
| 2004/0061324 A1 | 4/2004 | Howard |
| 2004/0063521 A1 | 4/2004 | Oister et al. |
| 2004/0171388 A1 | 9/2004 | Couronne et al. |
| 2004/0185952 A1 | 9/2004 | Marshall |
| 2005/0143199 A1 | 6/2005 | Saroyan |
| 2005/0197198 A1 | 9/2005 | Otten et al. |
| 2005/0227792 A1 | 10/2005 | McCreary et al. |
| 2005/0272517 A1 | 12/2005 | Funk et al. |
| 2005/0288119 A1 | 12/2005 | Wang et al. |
| 2006/0063574 A1 | 3/2006 | Richardson et al. |
| 2006/0103086 A1 | 5/2006 | Niemeyer et al. |
| 2006/0118096 A1 | 6/2006 | Cucjen et al. |
| 2006/0236993 A1 | 10/2006 | Cucjen et al. |
| 2006/0247070 A1 | 11/2006 | Funk et al. |
| 2006/0281061 A1 | 12/2006 | Hightower et al. |
| 2007/0021226 A1 | 1/2007 | Tyroler |
| 2007/0021242 A1 | 1/2007 | Krickler |
| 2007/0238539 A1 | 10/2007 | Dawe et al. |
| 2008/0146365 A1 | 6/2008 | Miesak |
| 2008/0192116 A1 | 8/2008 | Tamir et al. |
| 2008/0237251 A1 | 10/2008 | Barber |
| 2008/0287207 A1 | 11/2008 | Manwaring |

(56) References Cited

U.S. PATENT DOCUMENTS

| | | |
|---|---|---|
| 2008/0300071 A1 | 12/2008 | Valaika |
| 2008/0312010 A1 | 12/2008 | Marty et al. |
| 2009/0048039 A1 | 2/2009 | Holthouse et al. |
| 2009/0074246 A1 | 3/2009 | Distante et al. |
| 2009/0127809 A1 | 5/2009 | Meers |
| 2009/0210078 A1 | 8/2009 | Crowley |
| 2010/0032904 A1 | 2/2010 | Yasuoka et al. |
| 2010/0041498 A1 | 2/2010 | Adams |
| 2010/0090428 A1 | 4/2010 | Meers et al. |
| 2010/0137079 A1 | 6/2010 | Burke et al. |
| 2010/0148445 A1 | 6/2010 | Wilkins |
| 2010/0151955 A1 | 6/2010 | Holden |
| 2010/0184534 A1 | 7/2010 | Chan et al. |
| 2010/0210377 A1 | 8/2010 | Lock |
| 2010/0261557 A1 | 10/2010 | Joseph et al. |
| 2011/0028230 A1 | 2/2011 | Balardeta et al. |
| 2011/0143848 A1 | 6/2011 | Balardeta et al. |
| 2011/0143849 A1 | 6/2011 | Balardeta et al. |
| 2011/0151986 A1 | 6/2011 | Denton et al. |
| 2011/0224025 A1 | 9/2011 | Balardeta et al. |
| 2011/0304497 A1 | 12/2011 | Molyneux et al. |
| 2012/0015753 A1 | 1/2012 | Denton et al. |
| 2012/0015754 A1 | 1/2012 | Balardeta et al. |
| 2012/0029666 A1 | 2/2012 | Crowley et al. |
| 2012/0157200 A1 | 6/2012 | Scavezze et al. |
| 2012/0172148 A1 | 7/2012 | Freeman |
| 2012/0238381 A1 | 9/2012 | Denton et al. |
| 2012/0303207 A1 | 11/2012 | Reindl |
| 2012/0309554 A1 | 12/2012 | Gibbs et al. |
| 2012/0322568 A1 | 12/2012 | Lindeman |
| 2013/0005512 A1 | 1/2013 | Joseph et al. |
| 2013/0018494 A1 | 1/2013 | Amini |
| 2013/0095961 A1 | 4/2013 | Marty et al. |
| 2013/0104869 A1 | 5/2013 | Lewis et al. |
| 2013/0157786 A1 | 6/2013 | Joseph et al. |
| 2013/0210563 A1 | 8/2013 | Hollinger |
| 2013/0225305 A1 | 8/2013 | Yang et al. |
| 2013/0271458 A1 | 10/2013 | Andriluka et al. |
| 2013/0317634 A1 | 11/2013 | French et al. |
| 2013/0324310 A1 | 12/2013 | Leech et al. |
| 2014/0003666 A1 | 1/2014 | Park et al. |
| 2014/0128171 A1 | 5/2014 | Anderson |
| 2014/0330411 A1 | 11/2014 | Lochmann |
| 2015/0116501 A1 | 4/2015 | McCoy et al. |
| 2015/0202508 A1 | 7/2015 | Wise, Jr. |
| 2015/0292261 A1 | 10/2015 | Chou |
| 2016/0008662 A1 | 1/2016 | Cronin et al. |
| 2016/0023042 A1 | 1/2016 | Cherry |
| 2016/0023083 A1 | 1/2016 | Tawwater et al. |
| 2016/0074735 A1 | 3/2016 | Dawe et al. |
| 2016/0158626 A1 | 6/2016 | Dolige et al. |
| 2016/0193500 A1 | 7/2016 | Webster et al. |
| 2017/0021259 A1 | 1/2017 | Dismuke |
| 2017/0120132 A1 | 5/2017 | Shin et al. |
| 2017/0157484 A1 | 6/2017 | Altshuler et al. |
| 2017/0182361 A1 | 6/2017 | Tuxen et al. |
| 2017/0189753 A1 | 7/2017 | Polifka |
| 2017/0203182 A1 | 7/2017 | Spelman et al. |
| 2017/0259144 A1 | 9/2017 | Eddie |
| 2017/0259145 A1 | 9/2017 | Kline |
| 2017/0274262 A1 | 9/2017 | Sanchez et al. |
| 2017/0291093 A1 | 10/2017 | Janssen |
| 2017/0304705 A1 | 10/2017 | Hermandorfer |
| 2017/0319930 A1 | 11/2017 | Lewis et al. |
| 2017/0333777 A1 | 11/2017 | Spivak et al. |
| 2017/0340943 A1 | 11/2017 | Pierotti et al. |
| 2018/0036590 A1 | 2/2018 | DeAngelis et al. |
| 2018/0036616 A1 | 2/2018 | McKenney |
| 2018/0056124 A1 | 3/2018 | Marty et al. |
| 2018/0071577 A1 | 3/2018 | Swartz et al. |
| 2018/0137363 A1 | 5/2018 | Campagnoli et al. |
| 2018/0140917 A1 | 5/2018 | Song et al. |
| 2018/0189971 A1 | 7/2018 | Hildreth |
| 2018/0290019 A1 | 10/2018 | Rahimi et al. |
| 2018/0301169 A1 | 10/2018 | Ricciardi |
| 2018/0318715 A1 | 11/2018 | Dawe et al. |
| 2019/0087661 A1 | 3/2019 | Lee et al. |
| 2020/0298087 A1 | 9/2020 | Hermandorfer et al. |
| 2021/0146218 A1 | 5/2021 | Lewis et al. |
| 2021/0279896 A1 | 9/2021 | Tong et al. |
| 2021/0350566 A1* | 11/2021 | Hu .................. G06V 10/82 |
| 2022/0051419 A1 | 2/2022 | Spiteri |
| 2022/0391620 A1 | 12/2022 | Spiteri |

FOREIGN PATENT DOCUMENTS

| | | |
|---|---|---|
| CA | 2931744 A1 | 12/2014 |
| CN | 2892188 Y | 4/2007 |
| CN | 1824352 B | 4/2010 |
| CN | 102389634 A | 3/2012 |
| CN | 202223857 U | 5/2012 |
| CN | 103706088 A | 4/2014 |
| CN | 205964896 U | 2/2017 |
| CN | 104504694 B | 7/2017 |
| DE | 19938761 A1 | 2/2001 |
| DE | 102015225776 A1 | 6/2017 |
| EP | 1477825 A1 | 11/2004 |
| EP | 1897599 A2 | 3/2008 |
| EP | 1913981 A2 | 4/2008 |
| EP | 2227299 A2 | 9/2010 |
| EP | 2218483 B1 | 3/2017 |
| EP | 3188810 A1 | 7/2017 |
| EP | 3242728 A1 | 11/2017 |
| GB | 2196859 B | 5/1991 |
| GB | 2337385 A | 11/1999 |
| GB | 2442070 A | 3/2008 |
| GB | 2487047 A | 7/2012 |
| GB | 2487209 A | 7/2012 |
| GB | 2505417 A | 3/2014 |
| GB | 2539837 A | 12/2016 |
| GB | 2544561 A | 5/2017 |
| GB | 2560032 A | 8/2018 |
| JP | 2010112956 A | 5/2010 |
| KR | 101579382 B1 | 12/2015 |
| KR | 20160124254 A | 10/2016 |
| KR | 20170104700 A | 9/2017 |
| KR | 101799650 B1 | 11/2017 |
| TW | M353032 U | 3/2009 |
| TW | M551080 U | 11/2017 |
| WO | 95/21661 A1 | 8/1995 |
| WO | 2003032006 A1 | 4/2003 |
| WO | 2006126976 A1 | 11/2006 |
| WO | 2007037705 A1 | 4/2007 |
| WO | 2009138929 A1 | 11/2009 |
| WO | 2010102037 A2 | 9/2010 |
| WO | 2011106888 A1 | 9/2011 |
| WO | 2012/161768 A1 | 11/2012 |
| WO | 2014021549 A1 | 2/2014 |
| WO | 2015112646 A1 | 7/2015 |
| WO | 2016206412 A1 | 12/2016 |

OTHER PUBLICATIONS

U.S. Appl. No. 17/562,270, filed Dec. 27, 2021 Notice of Allowance dated May 15, 2023.
Anon., "Epipolar geometry" https://en.wikipedia.org/wiki/Epipolar_geometry, last accessed May 4, 2020.
Anonymous: "From Fashion to Football Vision Pushes the Envelope of Entertainment" Nov. 24, 2014; Nov. 24, 2014; URL: https//www.automate.org/industry-insights/from-fashion-to-football-vision-pushes-the-envelope-of-entertainment.
C. Spiteri et al. "Quasi-thematic feature detection and tracking for future rover long-distance autonomous navigation." Conference: Symposium on Advanced Space Technologies in Robotics and Automation, vol. 12, May 2013.
C. Spiteri, "Planetary Robotic Vision Processing for Terrain Assessment," Section 6.1.1—Doctoral Thesis, Surrey Space Centre, Faculty of Engineering and Physical Sciences, University of Surrey. 2018.
C. Spiteri, et al. "Structure Augmented Monocular Saliency for Planetary Rovers," Robotics and Autonomous Systems, vol. 88, Feb. 2017, pp. 1-10.

(56) References Cited

OTHER PUBLICATIONS

Careless James: "Bringing the Matrix to the NFL TV Tech," Sep. 9, 2013; Sep. 9, 2013 Retrieved from the Internet URL: https//www.tvtechnology.com/news/bringing-the-matrix-to-the-nfl.

Costa Brandon: "The Next Big Thing How Replay Technologies freeD System Is Taking Sports TV by Storm," Oct. 11, 2013; Oct. 11, 2013; URL: https//www.sportsvideo.org/2013/10/11/the-next-big-thing-how-replay-technologies-freed-system-is-taking-sports-tv-by-storm/.

PCT/US2021/025250 filed Mar. 31, 2021 International Search Report and Written Opinion dated Nov. 12, 2021.

R. I. Hartley et al. "Triangulation" CVIU—Computer Vision and Image Understanding, vol. 68, No. 2, pp. 146-157, Nov. 1997.

R. Sára, "3D Computer Vision" pp. 85-88, 100, 91-95. Oct. 30, 2012.

U.S. Appl. No. 16/993,030, filed Aug. 13, 2020 Non-Final Office Action dated Nov. 26, 2021.

U.S. Appl. No. 16/993,030, filed Aug. 13, 2020 Notice of Allowance dated Jul. 22, 2022.

U.S. Appl. No. 16/993,035, filed Aug. 13, 2020 Final Office Action dated Jan. 18, 2022.

U.S. Appl. No. 16/993,035, filed Aug. 13, 2020 Final Office Action dated Nov. 7, 2022.

U.S. Appl. No. 16/993,035, filed Aug. 13, 2020 Non-Final Office Action dated Jun. 29, 2022.

U.S. Appl. No. 16/993,035, filed Aug. 13, 2020 Non-Final Office Action dated Sep. 20, 2021.

C. Spiteri, "Generating a Three-Dimensional Topography of a Training Environment," filed Jul. 21, 2023, U.S. Appl. No. 18/224,987 including its prosecution history.

C. Spiteri, "System and Method for Object Tracking and Metric Generation," filed Aug. 13, 2020, U.S. Appl. No. 16/993,035 including its prosecution history.

C. Spiteri, "System and Method for Object Tracking Using a Subsection of a Sequence of Images," filed Jul. 14, 2023, U.S. Appl. No. 18/222,283 including its prosecution history.

C. Spiteri, "System and Method for Object Tracking," filed Aug. 13, 2020, U.S. Appl. No. 16/993,030 Including its prosecution history.

E. J. Lewis et al., "Ball Throwing Machine and Method," filed Feb. 9, 2015, U.S. Appl. No. 14/617,599 including its prosecution history.

E. J. Lewis et al., "Ball Throwing Machine and Method," filed Jul. 27, 2017, U.S. Appl. No. 15/662,150 including its prosecution history.

E. J. Lewis et al., "Ball Throwing Machine and Method," filed Nov. 2, 2011, U.S. Appl. No. 13/287,749 including its prosecution history.

E. J. Lewis et al., "Detection of the Speed of an Object Passing Through a Goal Plane," filed Mar. 28, 2023, U.S. Appl. No. 18/191,755 including its prosecution history.

E. J. Lewis et al., "Goal Apparatus," filed Sep. 19, 2018, U.S. Appl. No. 29/663,886 including its prosecution history.

E. J. Lewis et al., "System and Method for a User Adaptive Training and Gaming Platform," filed Dec. 27, 2021, U.S. Appl. No. 17/562,270 including its prosecution history.

E. J. Lewis et al., "System and Method for a User Adaptive Training and Gaming Platform," filed Nov. 15, 2019, U.S. Appl. No. 16/686,003 including its prosecution history.

E. J. Lewis et al., "System and Method for Object Tracking in Coordination With a Ball-Throwing Machine," filed Aug. 17, 2020, U.S. Appl. No. 16/995,289 including its prosecution history.

E. J. Lewis et al., "System, Apparatus and Method for an Intelligent Goal," filed Oct. 25, 2018, U.S. Appl. No. 16/171,127 including its prosecution history.

E. J. Lewis et al., "System, Apparatus and Method for Ball Throwing Machine and Intelligent Goal," filed Dec. 9, 2016, U.S. Appl. No. 15/374,984 including its prosecution history.

S. Plumer et al., "System and Method for Altering the Motion of a Foosball," filed Mar. 7, 2023, U.S. Appl. No. 18/180,109 including its prosecution history.

S. Plumer et al., "System and Method for Foosball Table Implementing Playing Obstacles," filed Mar. 4, 2021, U.S. Appl. No. 17/192,766 including its prosecution history.

"HitTrax," https://www.hittrax.com, last accessed Aug. 23, 2021.

PCT/US2020/060355 filed Nov. 13, 2020 International Search Report and Written Opinion dated Feb. 5, 2021.

U.S. Appl. No. 16/686,003, filed Nov. 15, 2019 Advisory Action dated Aug. 10, 2021.

U.S. Appl. No. 16/686,003, filed Nov. 15, 2019 Final Office Action dated May 19, 2021.

U.S. Appl. No. 16/686,003, filed Nov. 15, 2019 Non-Final Office Action dated Dec. 7, 2020.

U.S. Appl. No. 16/686,003, filed Nov. 15, 2019 Notice of Allowance dated Sep. 1, 2021.

U.S. Appl. No. 17/562,270, filed Dec. 27, 2021 Non-Final Office Action dated Nov. 25, 2022.

\* cited by examiner

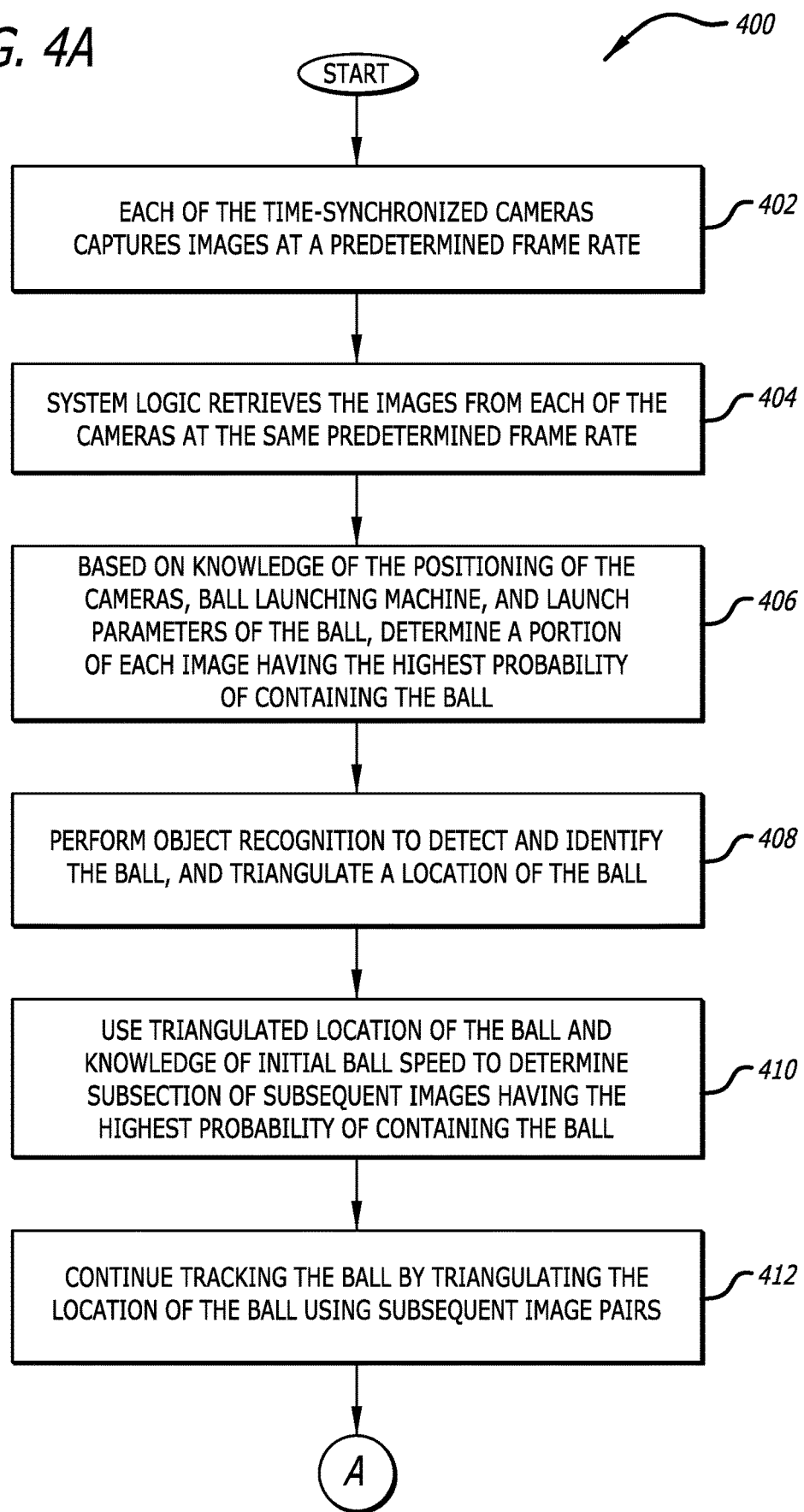

SYSTEM, METHOD AND APPARATUS FOR OBJECT TRACKING AND HUMAN POSE ESTIMATION

CROSS-REFERENCE TO RELATED APPLICATIONS

This application is a continuation of U.S. patent application Ser. No. 16/993,030, filed Aug. 13, 2020, which issued as U.S. Pat. No. 11,514,590, the entire contents of which is incorporated by reference herein.

FIELD

Embodiments of the disclosure relate to the field of user adaptive training and entertainment platforms. More specifically, one embodiment of the disclosure relates to an automated, computerized system for tracking an object within an enclosed space including a plurality of time-synchronized cameras specifically calibrated and configured to detect the object within a series of captured images and determine a trajectory of the object as it approaches a predefined point within the space such as a wall.

GENERAL BACKGROUND

In various sports, to be in control of the ball is of importance to every level of player. The ability to control an awkward bouncing or awkwardly thrown or launched ball quickly and effectively gives the player with the ball the immediate advantage. A player's first touch is often the difference between success and failure in most situations within a sporting event. Additionally, accuracy in passing and shooting a ball is essential in developing a well-rounded game in most sports. As players develop in skill, the level of competition increases, which typically results in an increase in the speed of game situations thereby demanding more speed from the player. Consequently, there is a greater need for accurate and precise interactions with a ball, such as accurate shooting and passing. Often, players cannot always place a ball, either to score a goal or even to place a shot or pass within a specific location of the goal (or desired location)—e.g., out of the reach of the goalie; therefore, a player may miss out on an opportunity to score points or assist a teammate.

Players can improve the accuracy of their shooting and passing by performing shooting and passing drills. Often, however, a player is unable to concentrate on keeping track of the location of each pass or shot within a goal or other area during drills involving several balls. Therefore, by the end of the drill, a player typically does not remember his/her accuracy and cannot determine whether he/she is improving based on results of previous drills. Additionally, although players may utilize video recording to review their training sessions or game play, a player may not understand the proper mechanics of performing certain moves or drills, and as a result, fail to learn anything from merely watching a video recording. Video recording technologies exist in which a video is captured of a ball (such as a golf ball) being hit from a static position with computer analysis performed on the player's swing. However, most sports are not limited to hitting a static ball; therefore, current technologies used to analyze a golf swing cannot be applied to analyze all aspects of other sports in which a critical component of the game is receiving a moving object.

In addition to the aim of many athletes to improve their performance within a specific sport, there is a large portion of the world population that enjoys sports and participates recreationally as opposed to competitively. This portion of the population may desire to participate in sport-like activities that do not necessarily require fully suiting up and participating in an organized, or even unorganized, sporting match. Using soccer, or football as it is referred to throughout most of the world, as one example, a person or groups of persons may desire to recreationally kick a soccer ball around or at a goal within a social atmosphere. Further, this group of persons may desire to compete against each other in ways such as determining who can most accurately kick a set of balls without having to chase after missed shots or collect kicked balls.

Additionally, this person or group of persons may desire to have their experience incorporate some form of video technology that enables simulation of various scenarios, such as simulating taking a penalty shot against a famous goalkeeper. Even further, this person or group of persons may desire to see a replay of their interactions with the ball.

The systems and methods disclosed herein provide unique and novel solutions to address shortcomings of current technologies with respect to the above. The concepts provided herein will become more apparent to those of skill in the art in view of the accompanying drawings and following description, which disclose particular embodiments of such concepts in greater detail.

BRIEF DESCRIPTION OF THE DRAWINGS

Embodiments of the disclosure are illustrated by way of example and not by way of limitation in the figures of the accompanying drawings, in which like references indicate similar elements and in which:

FIGS. 4A-4B provide a flowchart illustrating an exemplary method of tracking an object (e.g., a ball) in the studio space with the plurality of time-synchronized cameras in combination with logic of the object-tracking system of FIG. 2 and further performing a trajectory estimation in accordance with some embodiments;

DETAILED DESCRIPTION

Figure 1A:
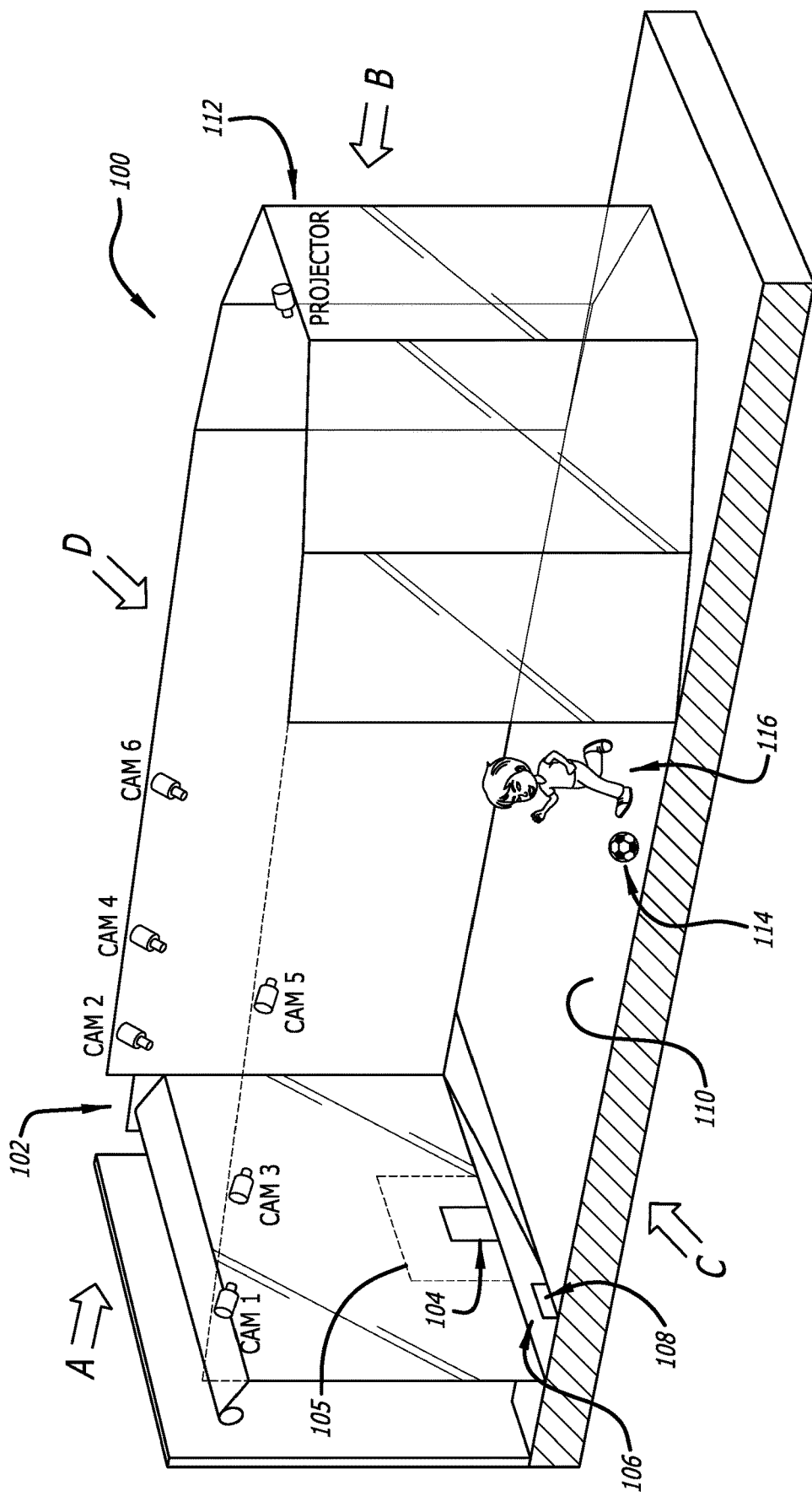
FIG. 1A illustrates a diagram of an exemplary studio space including a plurality of time-synchronized cameras calibrated for and configured to track movement of one or more objects within the studio space in accordance with some embodiments.

Various embodiments of the disclosure relate to an object tracking system that improves object tracking within a defined space and generating graphical visualizations based on data obtained or determined as a result of the object tracking. In some particular embodiments, the object tracking system includes a plurality of cameras that capture a series of images of a defined space following the launch of an object. The object tracking system further includes logic that receives the captured images and performs object recognition analyses to detect the object within images and "track" the object as it moves through the defined space.

More particularly, the plurality of cameras may be disposed around a defined space in a mirrored configuration such that half of the cameras are disposed on a first side of the defined space and the other half of the cameras are disposed on a second side, opposite the first side. Specifically, a first camera on a first side of the defined space is mirrored in physical placement and orientation by a second camera on the second side. The orientation of the cameras is such that an entire half of the defined space is captured by the field of view of at least two cameras on a given side, where the given side is opposite the side within the field of view. Additionally, the cameras are time-synchronized so each camera captures an image simultaneously (e.g., within a 40-nanosecond range) such that the object is located at the same point in the defined space in each image. The set of captured images for a given time are analyzed by logic of the object tracking system to detect the object and triangulate the object's position within the defined space using two of the captured images.

As will be discussed in further detail below, the camera configuration described above solves the problem of failing to capture two images where both images contain a moving object to be tracked at the same location and where both images are not affected by occlusion from the moving object, i.e., the object being within a close proximity to the camera lens such as substantially 1-1.5 meters. The need for two such images stems from the use of triangulation to determine the object's location within the defined space.

Further embodiments of the disclosure relate to an analysis of the moving object's determined location over time to determine a particular point on a wall, screen, netting, etc., of the defined space that the object is expected to contact and generating a visual graphic for display based on the determined point. For instance, the object may be traveling through the defined space toward a wall of the defined space and, when the object is determined to be a threshold distance from the wall based on the location tracking, the logic of the object tracking system may perform an analysis to determine a point on the wall that the object is expected to hit. The logic may then cause a graphic visualization to be displayed on the wall based on the determined point. As an alternative embodiment, a netting may be placed in front of an electronic screen (e.g., a television screen or monitor in communication with a computer), on which the visual graphic is rendered.

The examples provided in the disclosure are generally based in athletics and use specific terms relevant to sports (e.g., kick, ball); however, the disclosure is not intended to be limited to such examples. Instead, the such examples are merely intended to provide for an illustrative and clear description of the features of the invention. Further, although American soccer (generally referred to as "football" elsewhere in the world including the United Kingdom for example) is used as the primarily example, the disclosure is not so limited and instead applies to various sports including, but not limited or restricted to, soccer (football), American football, softball, baseball, hockey, tennis, golf, lacrosse, Frisbee, ping pong, rugby and/or basketball. The specific examples provided are done so for purposes of clarity and continuity throughout the description and illustrations.

Current camera systems and accompanying computer vision logic are insufficient to fill the particular objectives referenced above. Specifically, no current camera system and accompanying computer vision technology includes a plurality of time-synchronized cameras that capture a series of images such that accompanying computer vision logic may analyze a plurality of images, such that the analyses track the location of an object from the moment it is launched until the time the ball is received by a player, and from the moment the ball is released by the player toward a particular point or area (e.g., a screen, wall, or other designated area such as a physical goal apparatus). It should be understood that the term a "goal scored" (or comparable wording) refers to a ball contacting a particular a point of the screen 102, where some graphic is displayed on the screen 102.

In particular, one aspect in which current camera systems and accompanying computer vision logic fail to meet the above objectives is the inability of such systems and logic to handle the tracking of certain "large" objects at a close range, especially when the object is moving within a defined space. One example of a large object is a soccer ball where close range may refer to 1-1.5 meters from a camera lens. In some instances, the defined space may be 4.5 meters wide, 10 meters long, and approximately 3-3.5 meters in height. However, these measurements are merely intended as one illustration and not intended to be limited in any respect.

When considering traditional sports arenas or playing fields, there are a number of readily apparent differences from the predefined space discussed herein with one exemplary embodiment illustrated in FIG. 1A that prevent current camera systems and accompanying logic used therewith to meet the particular objectives described above. For example, sports arenas typically include a playing surface (field, court, rink, etc.) surrounded by stadium seating such that any videography equipment may be disposed high above or otherwise at a distance much greater than the defined space discussed herein. As videography equipment of current camera systems is disposed at a much greater distance from the athletic activities (e.g., one or more players interacting with a ball, puck or other object), such camera systems face no issues with occlusion of a camera's field of view by a ball, a player or other objects that from part of the game or gaming environment.

As one illustrative example, an American football stadium may have several cameras disposed around the stadium positioned to capture images or video of the football game. As the cameras are placed so far from the action, the football does not come close enough to a camera to occlude the view of the camera. Stated otherwise, as the football is so small relative to the field of view of the camera, the camera does not suffer from issues of ball occlusion. Thus, the camera configurations and accompanying logic of current camera systems do not account for possible occlusion of a camera's field of view. Further, such camera systems are not time-synchronized and configured to capture images simultaneously (e.g., within 40 nanoseconds).

The invention disclosed herein addresses new problems that arose due to the desire to track an object within a small and/or confined playing surface ("a studio space"). In particular, the studio space configuration created the problem of an object (e.g., a ball) occluding the view of a camera when the ball came within a close distance of the camera (e.g., substantially 1 meter) such that an image captured by the occluded camera lens is insufficient for use by logic of the object-tracking system to triangulate the location of the ball. In particular, when an image is captured with the ball at such a close distance to the lens of the camera, the logic of the object-tracking system cannot identify features of the studio space due to ball occlusion and therefore cannot use the image to triangulate the location of the ball.

As will be discussed in further detail below, the invention addresses the occlusion problem through a particular camera configuration where a plurality of cameras are disposed surrounding the playing surface of the studio space such that half of the plurality of cameras are located on a first side of the playing surface and the other half of the plurality of cameras are located on the opposite side, where the two halves are located in mirrored physical placement and orientation. Further, the configuration is such that a longitudinal half of the playing surface is within the field of view of at least two cameras located on the opposite side of the playing surface. As a result, the logic of the object tracking systems discussed below will have at least two images containing the ball that are unaffected by the ball occlusion problem discussed above.

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "top," "bottom," "front," "back," and the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

In certain situations, the terms "logic" and "subsystem" are representative of hardware, firmware, and/or software that is configured to perform one or more functions. As hardware, the logic (or subsystem) may include circuitry having data processing and/or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic.

Alternatively, or in combination with hardware circuitry, the logic (or subsystem) may be software in the form of one or more software modules. The software modules may include an executable application, a daemon application, an application programming interface (API), a subroutine, a function, a procedure, an applet, a servlet, a routine, source code, a shared library/dynamic load library, or even one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or subsystem) may be stored in persistent storage.

The term "network device" should be generally construed as physical logic (electronics) or virtualized logic with data processing capability and/or a capability of connecting to any type of network, such as a public network (e.g., internet), a private network (e.g., any type of local area network), a public cloud network (e.g., Amazon Web Service (AWS®), Microsoft Azure®, Google Cloud®, etc.), or a private cloud network. Examples of a network device may include, but are not limited or restricted to, any of the following: a server; a mainframe; a firewall; a data transfer device (e.g., intermediary communication device, router, repeater, portable mobile hotspot, etc.); an endpoint device (e.g., a laptop, a smartphone, a tablet, a desktop computer, a netbook, gaming console, etc.); or a virtual device being software that supports data capture, preliminary analysis of meta-information associated with cybersecurity intelligence.

The term "message" generally refers to signaling (wired or wireless) as either information placed in a prescribed format and transmitted in accordance with a suitable delivery protocol or information made accessible through a logical data structure such as an API. Examples of the delivery protocol include, but are not limited or restricted to HTTP (Hypertext Transfer Protocol); HTTPS (HTTP Secure); Simple Mail Transfer Protocol (SMTP); File Transfer Protocol (FTP); iMESSAGE®, Instant Message Access Protocol (IMAP); or the like. Hence, each message may be in the form of one or more packets, frames, or any other series of bits having the prescribed, structured format.

The term "computerized" generally represents that any corresponding operations are conducted by hardware in combination with software and/or firmware.

The term "transmission medium" generally refers to a physical or logical communication link (or path) between two or more network devices. For instance, as a physical communication path, wired and/or wireless interconnects in the form of electrical wiring, optical fiber, cable, bus trace, or a wireless channel using infrared, radio frequency (RF), may be used.

In certain instances, the terms "compare," comparing," "comparison," or other tenses thereof generally mean determining if a match (e.g., identical or a prescribed level of correlation) is achieved between two items where one of the items may include content within meta-information associated with the feature.

Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

I. General System Architecture—Object Tracking

Referring to FIG. 1A, a perspective view of an exemplary studio environment including a plurality of cameras utilized to track an object within the studio environment is shown according to some embodiments. As was discussed above, the object-tracking system and methods associated therewith may be used in conjunction with any of several sports including, but not limited or restricted to, soccer (football), American football, softball, baseball, hockey, tennis, golf, lacrosse, Frisbee, ping pong, rugby and/or basketball. The fact that examples and illustrations provided herein are in reference to soccer is not intended to limit the disclosure but is done so for purposes of clarity and continuity throughout the description and illustrations.

The studio environment includes a studio space 100 configured for a player 116 to receive a ball 114 from a ball launching machine 105 and return the ball 114 in the direction of the ball launching machine 105 at a screen 102 (or wall). It is noted that one or more players may participate; however, a single player is illustrated for the sake of clarity. In the illustrative embodiment shown, the studio environment comprises the trapezoidal-shaped studio space 100, where sides of the studio space 100 are labeled as A-D. A ball launching machine 105 and screen 102 are located at side A and an opening may be located at side B, which may allow the player to enter the playing space 100. In some embodiments, a wall having a door or entrance way may be comprise side B. In some embodiments, the wall of side B may be a mesh or netting. Further, a projector may be disposed at side B (i.e., affixed to an upper portion of a wall or the ceiling) and configured to project an image onto the screen 102. However, in other embodiments, the projector 112 may be located distal the screen 102 on side A relative to side B (e.g., located behind the screen 102 relative to the playing surface 110). Additionally, the projector 112 may project an image on any of the walls of the space 100. It should be understood that the projector 112 may be positioned elsewhere within the studio environment. Additionally, sides C-D further surround the studio space 100, where each of the sides C-D include half of the plurality of cameras utilized in tracking the ball 114.

As shown, six cameras form the plurality of cameras utilized in tracking the ball 114. As will be discussed below, embodiments of an object-tracking system include a plurality of cameras and a plurality of logic modules. In particular, the plurality of cameras of the object-tracking system are configured to capture images of a ball launched by a ball launching machine 105 and the accompanying logic may perform analyses of the captured images to track the ball 114 as it travels to the player 116 and is returned toward the screen 102 (e.g., as the player kicks the ball toward the screen). Although the exemplary embodiment of the figures herein illustrates that the plurality of cameras is comprised of six cameras, the disclosure is not limited to this number. The object-tracking system may include an alternative even number of cameras configured to capture images for object tracking, such as 2, 4, 8, 10, etc., such that half of the plurality is located on side C and the other half is located on side D with each half being mirrored in physical position and orientation to the other half. Additional cameras will be discussed below configured to capture images for replay generation and/or human pose estimation.

Figure 2:
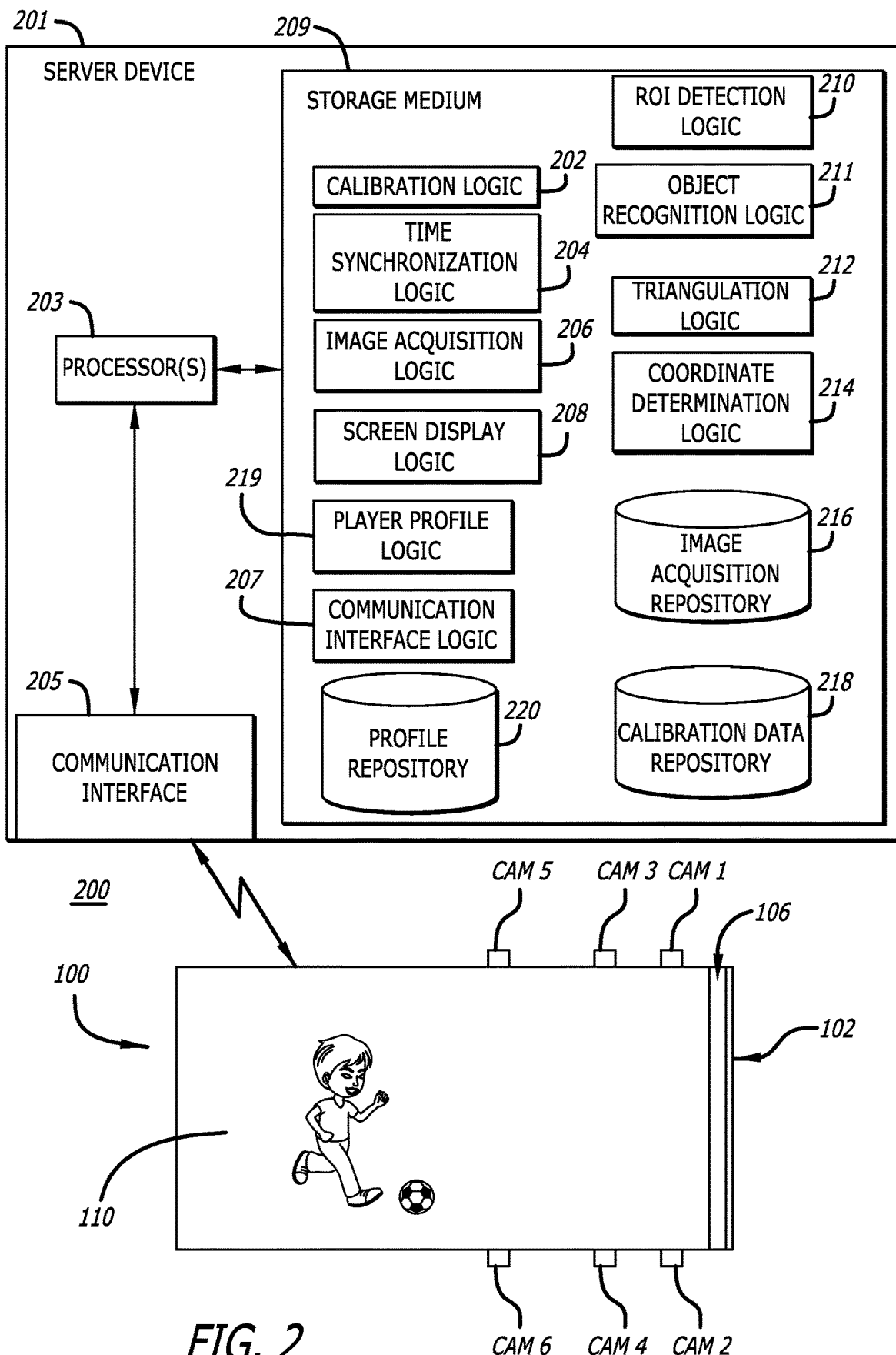
FIG. 2 is an exemplary embodiment of a logical representation the object-tracking system of FIG. 1A in accordance with some embodiments.
Figure 6:
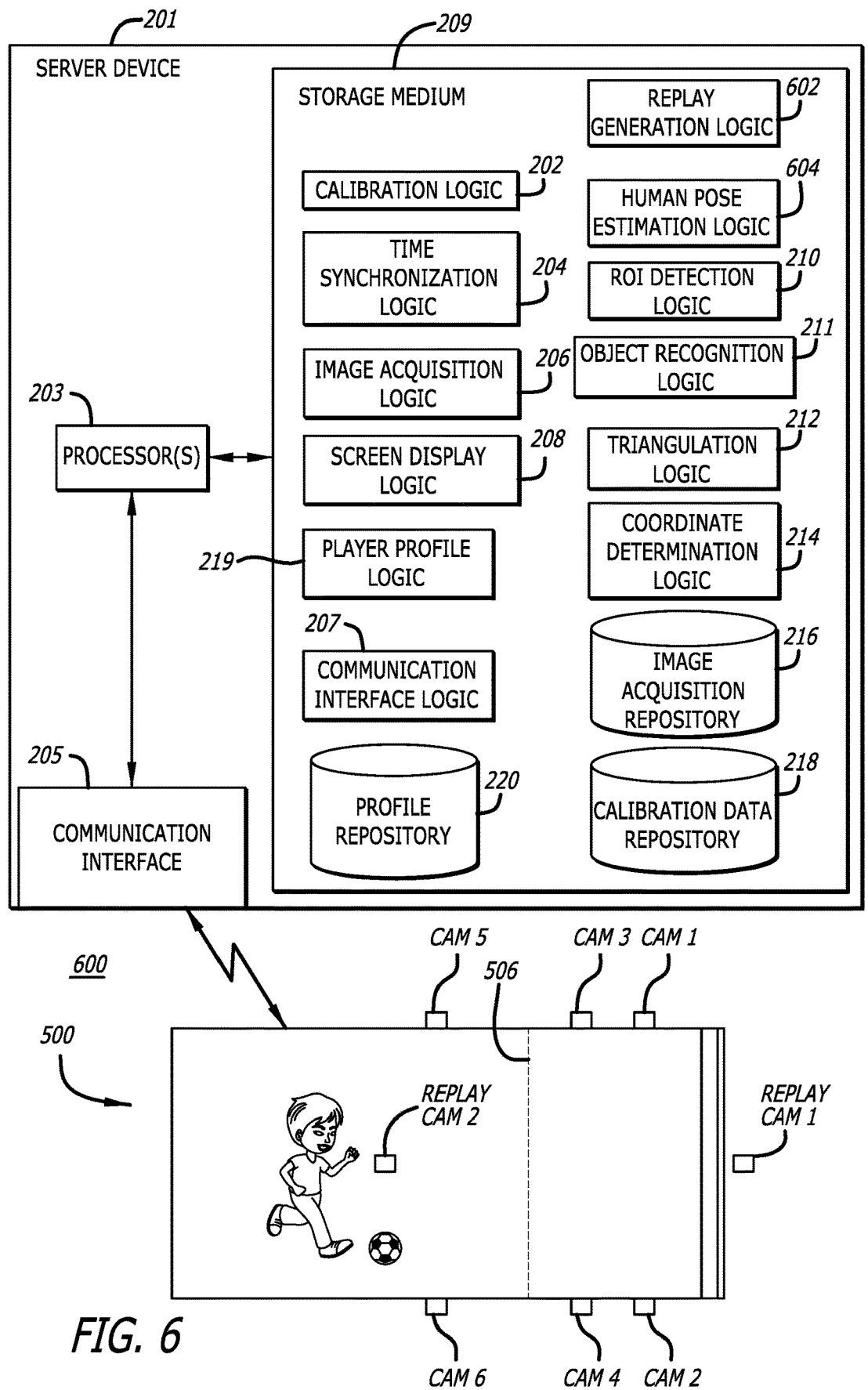
FIG. 6 is an exemplary embodiment of a logical representation an object-tracking system including replay logic and human pose estimation logic in accordance with some embodiments.

The logic of the object-tracking system (illustrated in FIGS. 2 and 6) may further execute a ballistic trajectory equation using parameters obtained through tracking the ball to determine a point on the screen at which the ball will, or is expected, to contact. The logic may further generate and transmit instructions to the projector to display a graphic, visualization, etc., on the screen based on the determined point. The instructions may be transmitted via a wired and; or wireless connection. As is illustrated in FIGS. 2 and 6 and discussed more below, the logic may include a plurality of logic modules that are stored on non-transitory, computer-readable medium of a server device, which may be located within a local computer or remotely, e.g., stored and processing within a cloud computing environment.

As one example, a player 114 may be participating in a virtual game comprising a virtual goalie and goal displayed on the screen 102 by the projector 112 such that the player 114 is to receive a ball 114 from the ball launching machine 105 and kick the ball 114 at the screen 102 attempting to place the ball 114 such that the ball 114 contacts the screen 102 in a position resulting in a "goal," i.e., the ball is to contact the screen at a location within virtual goal posts displayed on the screen other than where the goalie is positioned. In such an embodiment, the plurality of cameras and logic of the object-tracking system may, collectively, capture a plurality of images of the playing surface 110 and analyze the captured images to identify the location of the ball 114 as it travels toward the player 116, as the player 116 interacts with the ball 114 and as the ball 114 travels away from the player 116 and toward the screen 102. The logic may further determine an expected contact point on the screen 102 (e.g., coordinates of the screen 102, or "screen coordinates") and generate instructions causing the projector 112 to display a visual on the screen 102, e.g., providing a virtual display of a ball passing by the goalie or a ball being blocked by the goalie.

Figure 1B:
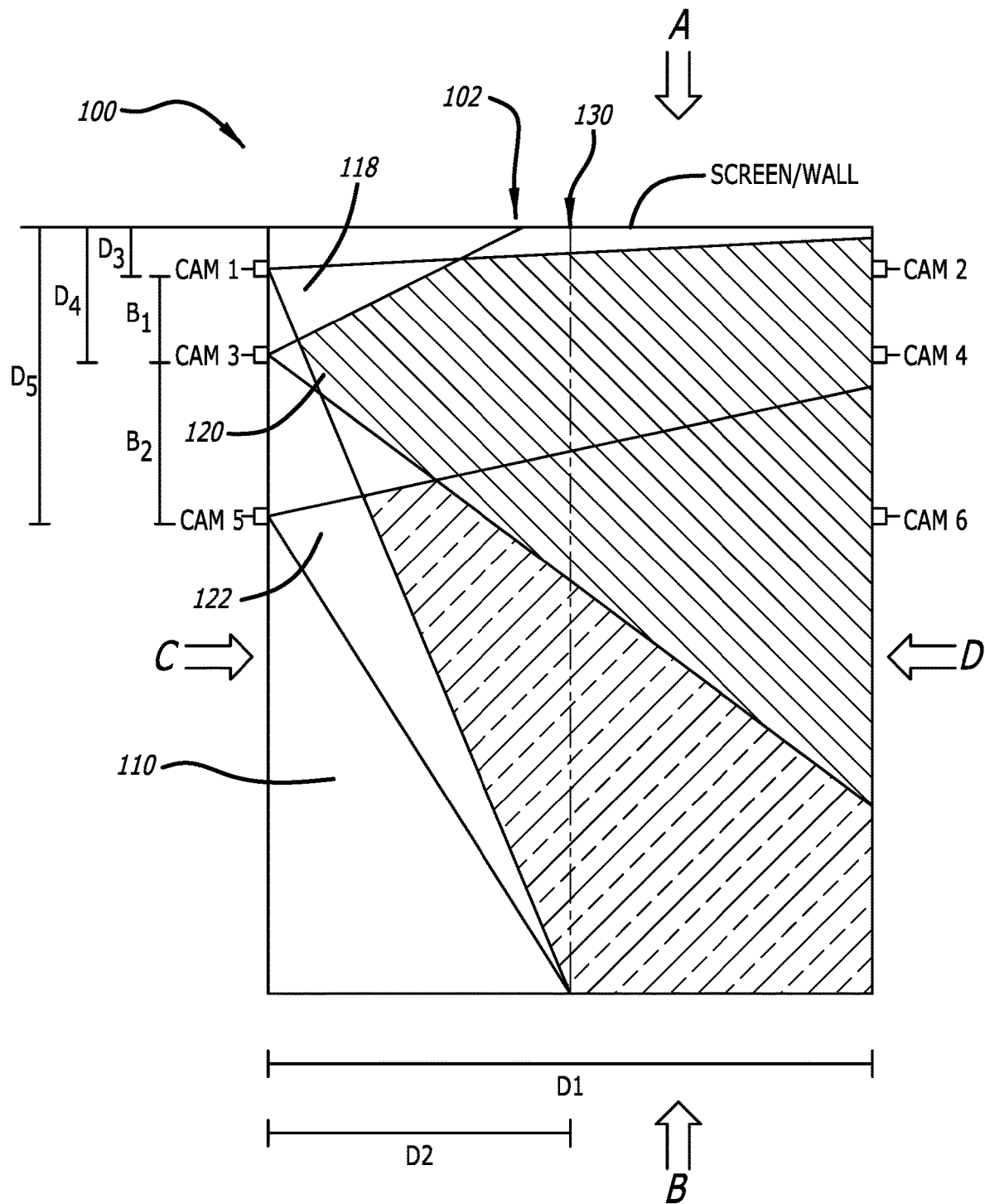
FIGS. 1B-1C are top-down views of the studio space of FIG. 1A illustrating the field of view of a subset of the plurality of time-synchronized cameras in accordance with some embodiments.
Figure 1C:
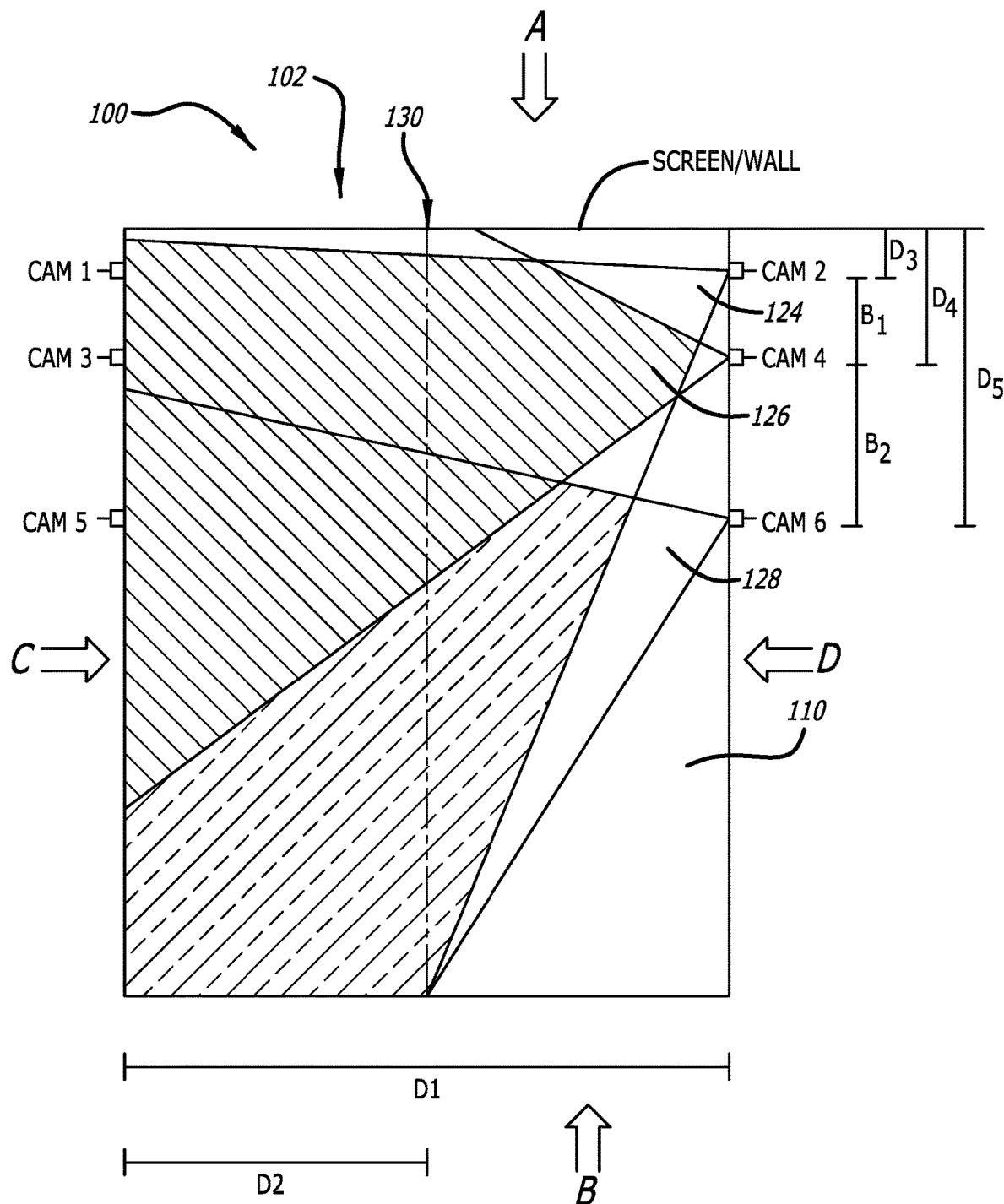

In further detail, the object-tracking system includes a specific configuration of the plurality of cameras to capture images of the playing surface 110 and screen 102 following the launch of a ball 114. The plurality of cameras is positioned in a mirrored configuration such that camera 1 and camera 2 are at mirrored positions relative to a center axis 130 (as seen in FIGS. 1B-1C) that runs from side A to side B. In other words, camera 1 and camera 2 are located an equal distance away from the screen 102 on opposing sides of the studio environment, e.g., sides C and D, respectively. Similarly, cameras 3,4 and 5,6 are each disposed in mirrored positions and orientations.

Additionally, the cameras of the object-tracking system are time-synchronized such that each camera captures an image at the same time. As will be discussed, time-synchronization is integral in the configuration in order to enable the accompanying logic to triangulate the position of the ball 114 using an image pair (i.e., two images captured from two separate cameras at the same time).

Referring now to FIGS. 1B-1C, top-down views of the studio space of FIG. 1A illustrating the fields of view of a subset of the plurality of time-synchronized cameras as shown in accordance with some embodiments. FIG. 1B illustrates the field of view of each camera of a first set of cameras of the object-tracking system, where the first set of cameras is disposed on side C of the studio space. As is shown through varying shadings, the field of view of multiple cameras overlap. Similarly, FIG. 1C illustrates the field of view of each camera of a second set of cameras of the object-tracking system, where the second set of cameras is disposed on side D of the studio space. FIGS. 1B-1C also illustrate a distance (D1) being the entire width of the studio space, a distance (D2) being half of width of D1. In some exemplary embodiments, the distance D1 may, for example, 3.5 meters and in other exemplary embodiments, the distance D1 may be 6 meters. However, other distances are within the scope of the disclosure. Further, a distance (D3) being the distance from the screen to the cameras 1,2 (e.g., substantially 25 cm), a distance (D4) being the distance from the screen to the cameras 3,4 (e.g., substantially 120 cm), and a distance (D5) being the distance from the screen to the cameras 5,6 (e.g., substantially 350 cm). The FIGS. 1B-1C also illustrate baseline distances (B1) and (B2), where B1 represents the distance between cameras 1,3 and 2,4 (e.g., 95 cm). Additionally, B2 represents the distance between the cameras 3,5 and 4,6 (e.g., substantially 230 cm). The distances (D1-D3) and the baseline distances (B1-B2) are utilized by the logic of the object-tracking system to triangulate the location of the ball. The distances described above are merely one exemplary embodiment and are not intended to limit the scope of the disclosure. Further, the distances (D1-D3) and the baseline distances (B1-B2) may be adjusted based on the size of the playing surface.

Based on FIGS. 1B-1C, it should be understood that a plurality of cameras captures images of a ball traveling through any point in the studio space. Additionally, as the logic of the object-tracking system analyzes the images to triangulate a position of the ball, the logic analyzes the images captured by cameras on the opposite side of the studio as the ball relative to the center axis 130. For example, as a ball travels through the studio space to the left of the center axis 130 (from the top-down perspective), the images captured by the cameras of side D (cams 2, 4 and/or 6) are utilized in the analysis that triangulates the position of the ball within the studio the space. Thus, when a ball is located within a certain distance relative to one camera (e.g., 1-1.5 meters), the occlusion of the camera lens from the ball does not present an issue for the system described herein as images from a plurality of cameras opposite the occluded camera capture the ball and may be used to triangulate the location of the ball.

a. System Calibration

Each camera of the object-tracking system is included in a calibration process involving both of an intrinsic and an extrinsic calibration. The intrinsic calibration enables logic of the object-tracking system to determine the distortion that occurs with each camera when dewarping an image captured by that camera. It should be understood that "dewarping" may also be referred to as flattening and/or undistorting. The extrinsic calibration enables the system logic to determine the relationship between each camera and every other camera. The extrinsic calibration includes determining how a flat plane of an image captured by a first camera relates to a flat plane of an image captured by a second camera. Further, the calibration process may include determination of a set of transformation matrices, where a transformation matrix is generated for each camera pair, where a transformation matrix corresponds to the transformation of a 3D point in camera coordinates to world reference coordinates. In one embodiment, the transformation matrices are in turn used to calculate the Fundamental matrices and the origin transform, where the origin point is assumed to be the top intersecting corner of the screen or wall 102 on side A with side C.

Additionally, for each camera pair, a 2D grid of points mapping the overlapping views of each camera of the pair to each other. Additional detail regarding the calibration process is discussed with respect to FIG. 3.

II. Logical Representation—Object Tracking

Referring to FIG. 2, an exemplary embodiment of a logical representation the object-tracking system of FIG. 1A is shown in accordance with some embodiments. FIG. 2 illustrates that logic comprising the object-tracking system 200 may be disposed on non-transitory, computer-readable medium ("storage medium") 209 of a server device 201. In some embodiments, the server device 201 may refer to a cloud computing environment. In other embodiments, the server device 201 may refer to a network device that is located locally (or remotely) with respect to the studio space of FIGS. 1A-1C. The server device 201 may include one or more processors 203 in communication with a communication interface 205 and the storage medium 209. A communication interface logic 207 may be executed to control operations of the communication interface 205. For example, the data (e.g., images and instructions) may be exchanged between the logic of the object-tracking system 200 stored on the server device 201 and components of the studio environment, such as the plurality of cameras, the ball launching machine 105, the projector 112, etc.

The logic of the object-tracking system 200 may comprise several logic modules including a calibration logic 202, a time synchronization logic 204, an image acquisition logic 206, a screen display logic 208, a triangulation logic 212, a region-of-interest (ROI) detection logic 210, a coordinate determination logic 214 and a player profile logic 219. The object-tracking system 200 may further include an image acquisition repository 216 and a calibration data repository 218.

Figure 3:
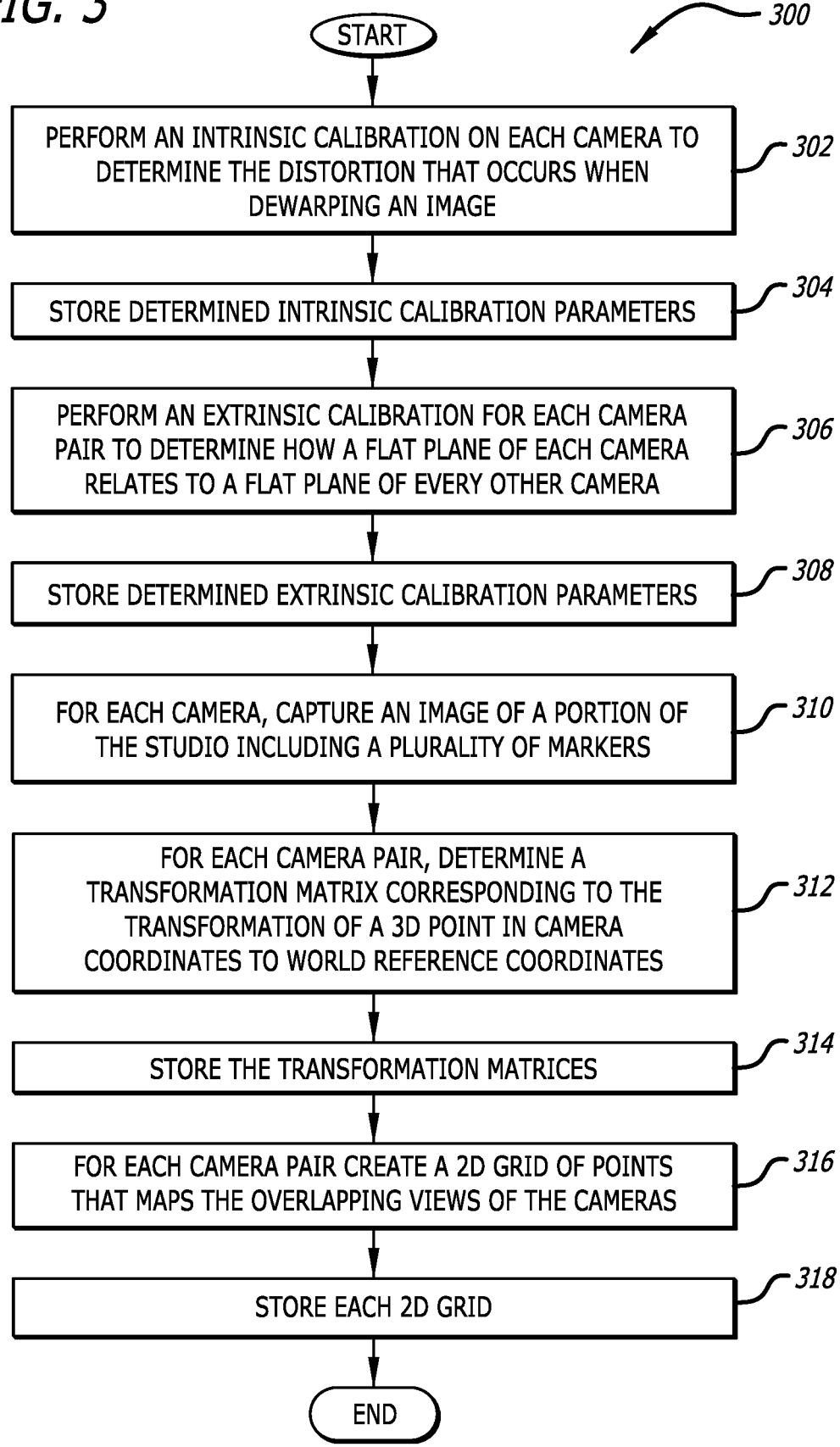
FIG. 3 illustrates a flowchart illustrating an exemplary method of calibrating the plurality of time-synchronized cameras in accordance with some embodiments.

Generally, the calibration logic 202, when executed by the one or more processors 203, performs operations of the intrinsic and extrinsic calibration processes referenced above and discussed further with respect to FIG. 3. The calibration logic 202 may then store calibration parameters determined during the intrinsic and extrinsic calibrations in the calibration data repository 218. The time-synchronization logic 204, when executed by the one or more processors 203, performs operations that time synchronize the cameras (e.g., the cameras of the object-tracking system and the cameras of the replay system, discussed below and seen in FIG. 5). For instance, the time synchronization logic 204 may utilize the Precision Time Protocol (PTP) to synchronize clocks of the cameras. In some embodiments, the plurality of cameras are time-synchronized to the nearest 40 nano-seconds. Such an embodiment provides for the cameras to capture the ball at the same point in space to a high degree of precision when an object is traveling at a high rate of speed (e.g., as a soccer ball may travel up to 44 meters/second or approximately 100 miles/hour). Capturing the object in multiple images at the same point in space is integral in triangulating the moving object's location in space, otherwise the triangulation equations will not converge to a single point.

The image acquisition logic 206, when executed by the one or more processors 203, performs operations to obtain images captured by the cameras. Such operations may include retrieving, i.e., querying or downloading, the captured images from a ring buffer of each camera. In some instances, the image acquisition logic 206 retrieves the captured images at a rate equal to the frame rate of the cameras. In some instances, the cameras of the object-tracking system 200 are configured to capture images at a frame rate within the range of 80-100 frames/second. The retrieved images may be stored in the image acquisition repository 216. In some embodiments, the captured images have an aspect ratio of 1920×1080 pixels.

The screen display logic 208, when executed by the one or more processors 203, performs operations configured to generate instructions to cause a graphic to be displayed by the projector 112 onto the screen 102. In addition, the instructions may cause an alteration of the graphic currently displayed.

The ROI detection logic 210, when executed by the one or more processors 203, performs operations that detect particular regions of interest within the captured images. Such operations may include determination of a subsection of each captured image to analyze in attempting to detect a ball, a player and/or other objects, such as bottles, glasses, shoes, pets, etc. (and/or a player). For instance, the ROI detection logic 210 may initially utilize the known locations of each camera of the object-tracking system 200 and of the ball launching machine 105 as well as the known launch speed and launch orientation of a ball to determine a subsection ("the ROI") of each captured image to analyze when attempting to find the ball following its launch. Following the initial detection of the ball, the ROI detection logic 210 may utilize previously analyzed images and the known launch speed and launch orientation to detect a subsection (the ROI) to analyze when attempting to track the ball. In some embodiments, the size of the ROI may range from substantially 100×100 pixels to 400×400 pixels. In some embodiments, the size of the ROI to be determined may be configurable prior to runtime. It should also be noted that the ROI need not be a square but may take other dimensions.

The object recognition logic 211, when executed by the one or more processors, performs image analysis operations to analyze captured images and perform one or more of image classification, object localization, object detection and/or object segmentation ("object recognition"). Various methods may be utilized to perform the object recognition including, for example, convoluted neural networks or other trained machine learning models.

The triangulation logic 212, when executed by the one or more processors, performs triangulation operations using two captured images (captured at the same time) that determine the location of the ball and/or player(s) within the studio space. The triangulated location information may be provided to the ROI detection logic 210 for use in determining the subsection of subsequent images for analysis.

Together, the analyses and processing of the captured images of by the object recognition logic 211 and the triangulation logic 212 generate object-tracking data (or, with reference to the embodiments illustrated herein, "ball-tracking data"). The object-tracking data refers to data indicating one or more of the following: a location of a detected object within a plurality of captured images, a label of the detected object (i.e., identifying or classifying the object), a bounding box of the object and the object's location within the studio space at multiple times. For instance, the object-tracking data may include a listing of the object's location within the studio space at every 10 milliseconds subsequent to the launch of the object. However, other timing periods may be used, and the disclosure is not intended to be limited to 10 millisecond increments.

The coordinate determination logic 214, when executed by the one or more processors 203, performs operations that include execution of a ballistic trajectory equation based on the data obtained from tracking the ball (i.e., continued determination of its triangulated location as the ball travels toward the player and is then returned toward the screen 102). The ballistic trajectory equation results in a determination of a set of coordinates indicating a point on the screen 102 that the ball is expected to contact. The determined coordinates may be provided to the screen display logic 208 for generation of instructions to cause a graphic to be displayed on the screen 102, for example, at the determined coordinates.

In some embodiments, each launch of a ball may be associated with a particular player profile or with a session where the session is associated with a particular player profile. For instance, prior in initiating a session in which one or more balls are launched from a ball machine, the player may provide player profile credentials (e.g., via a network device) that are received by player profile logic 219. The player profile logic 219 may, when executed by the one or more processors 203, perform operations to associate all data retrieved with a particular session and processing performed thereon with a player profile corresponding to the received credentials. For example, generated replays, determined metrics, one or more captured images, etc., may be associated with the player's player profile and stored in the profile repository 220. As used herein, the term "session" may refer to one or more balls launched by the ball launching machine, where each ball launched is associated with a particular instruction received by the ball launching machine. For example, a session refers to the launching of a series of balls that a player is to receive and return toward the screen 102 (e.g., via a kick or motion with one's head). The session may be initiated by receipt of an instruction by the ball launching machine 205, where the instruction details one or more of a number of balls to launch, launch parameters for one or more balls and a timing between each launch. Additionally, other embodiments include instructions that launch balls in response to the player and ball interactions and/or where the ball contacts the screen 102 (e.g., end the session after a threshold number of "goals" based on where a number of balls contacts the screen 102).

III. Operational Flow a. Calibration

Referring to FIG. 3, an exemplary operational flow of the intrinsic and extrinsic calibration processes is shown. Each block illustrated in FIG. 3 represents an operation performed in the method 300 performed by an object-tracking system, such as the object-tracking system 200 of FIG. 2. It should be understood that not every operation illustrated in FIG. 3 is required. In fact, certain operations may be optional to complete aspects of the method 300. The discussion of the operations of method 300 may be done so with reference to any of FIGS. 1A-2. Prior to the initiation of the method 300, it is assumed that a plurality of cameras has been disposed the perimeter of a predetermined space, such as the around in the perimeter of the playing surface 110 of the studio space 100 of FIGS. 1A-1C. In particular, as discussed with respect the embodiment of FIGS. 1A-1C, the plurality of cameras are comprised of an even number of cameras where half of the plurality is disposed on a first side of the predetermined space and the other half is disposed on the opposite, second side of the predetermined space. Further, the first half of the plurality is mirrored in position and orientation by the second half of the plurality.

Herein, the method 300 starts with performance of an intrinsic calibration on each camera of the plurality to determine the distortion that occurs when dewarping an image captured by the camera (block 302). With reference to FIGS. 1A-2, the calibration logic 202 performs an intrinsic calibration on each of cameras 1-6 on an image captured by each camera. Following performance of the intrinsic calibration on each camera, the determined intrinsic calibration parameters are stored, for example in the calibration data repository 218 (block 304). Stated generally, the intrinsic calibration parameters represent a flattening of (or undistorting) an image captured by a camera and enabling determination of a point in the image in a flat plane (or undistorted image).

The method 300 continues with performance of an extrinsic calibration on each camera pair of the plurality to determine how a flat plane of each camera relates to a flat plane of every other camera (block 306). With reference to FIGS. 1A-2, the calibration logic 202 performs an extrinsic calibration on each of cameras 1-6 on an image captured by each camera. The extrinsic calibration process determines a relationship of a flat plane of a first camera and a flat plane of every other camera. Following performance of the extrinsic calibration on each camera pair, the determined extrinsic calibration parameters are stored, for example in the calibration data repository 218 (block 308).

The method 300 further includes operations directed at determining a transformation matrix between each camera pair. Specifically, the method 300 continues by capturing an image of a portion of the predetermined space that includes one or more markers (block 310). It should be understood that, in some embodiments, the images captured in the operations discussed above may be utilized in place of the operation of capturing additional images. Subsequently, for each camera pair, the method 300 includes the determination of a transformation matrix that corresponds to the transformation of a three-dimensional (3D) point in camera coordinates to world reference coordinates (block 312). Following performance of the transformation matrices determinations, the transformation matrices are stored, for example in the calibration data repository 218 (block 314).

Further, for each camera pair, the method 300 involves the generation of a two-dimensional (2D) grid of points that maps overlapping views of each camera within the camera pair (block 316). Finally, the method 300 ends with following the storage of each 2D grid, for example in the calibration data repository 218 (block 318). As will be discussed below, for example with respect to FIG. 5, an additional pair of cameras may be disposed to capture images of the predetermined space. In embodiments that include such an additional pair of cameras, e.g., cameras 7-8 of FIG. 5, the additional pair of cameras will also be included in the method 300.

b. Object Tracking

Figure 4B:
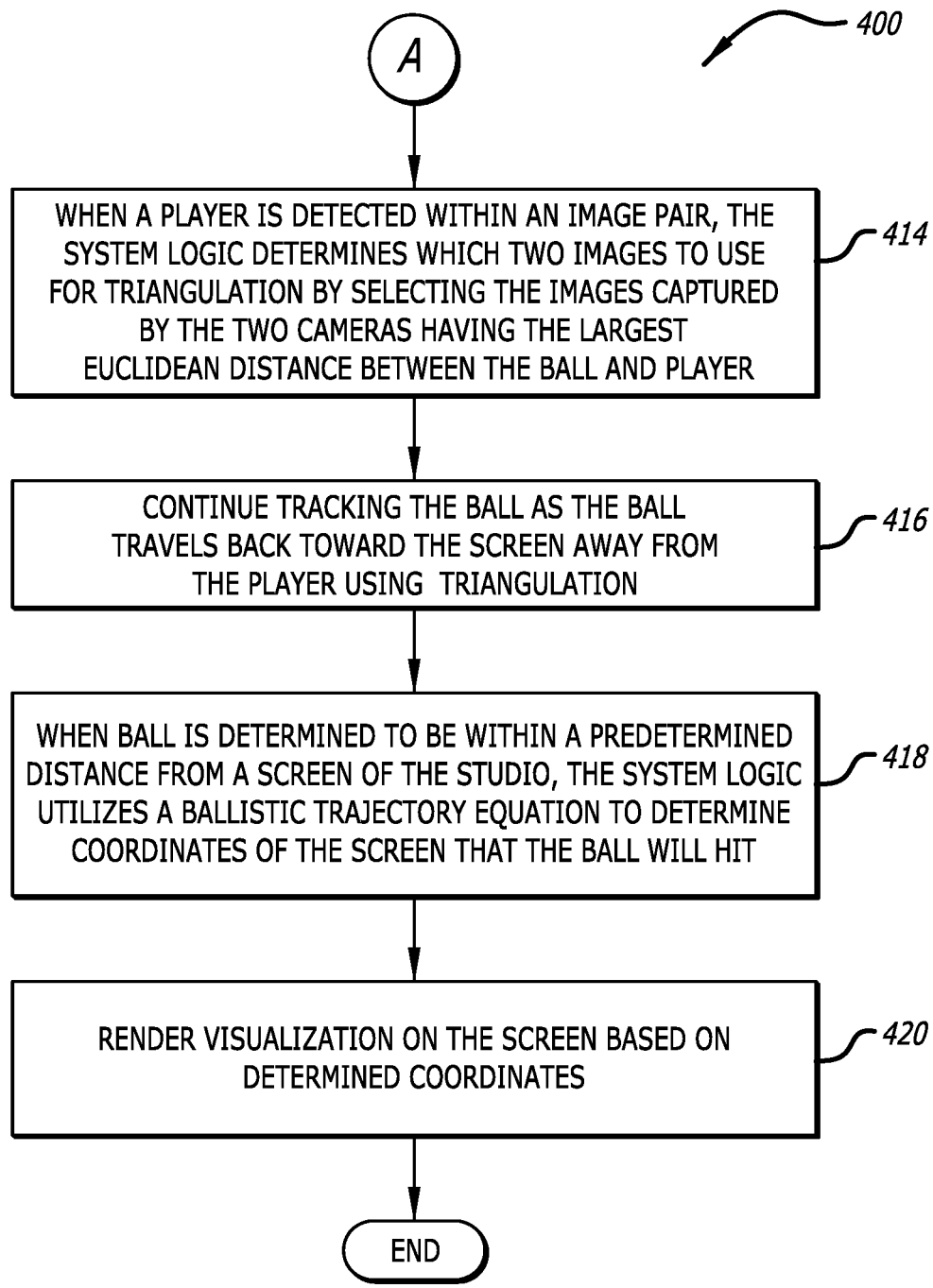

Referring now to FIGS. 4A-4B, a flowchart illustrating an exemplary method of tracking an object (e.g., a ball) in the studio space with the plurality of time-synchronized cameras in combination with logic of the object-tracking system of FIGS. 1A-2 and further performing a trajectory estimation is shown in accordance with some embodiments. Each block illustrated in FIGS. 4A-4B represents an operation performed in the method 400 performed by an object-tracking system, such as the object-tracking system 200 of FIG. 2. It should be understood that not every operation illustrated in FIGS. 4A-4B is required. In fact, certain operations may be optional to complete aspects of the method 400. The discussion of the operations of method 400 may be done so with reference to any of FIGS. 1A-2.

The assumptions that were discussed with respect to FIG. 3 are assumed to have occurred prior to the initiation of the method 400. An additional assumption that is to occur prior to the initiation of the method 400 is the performance of the method 300 so that intrinsic and extrinsic calibrations have been performed for the plurality of cameras disposed around a predetermined space, transformation matrices have been determined and 2D grids of overlapping points have been developed.

The method 400 begins as each of the time-synchronized plurality of cameras captures images at a predetermined frame rate (block 402). System logic, e.g., the image acquisition logic 206, when executed by the one or more processors, performs operations to obtain images captured by the cameras, e.g., querying, downloading or receiving, the captured images from a ring buffer of each camera (block 404). In some instances, the image acquisition logic retrieves the captured images at a rate equal to the frame rate of the camera. In some instances, the cameras of the object-tracking system are configured to capture images at a frame rate within the range of 80-100 frames/second. The retrieved images may be stored in the image acquisition repository 216.

Based on knowledge of the disposition (e.g., physical placement and orientation) of each of the plurality of the cameras of the object-tracking system and knowledge of the ball launching machine 105 (including launch parameters of a launched ball), system logic, e.g., the ROI detection logic 210, determines a portion of each image having the highest probability of containing the launched ball (block 406). More specifically, based on the known launch parameters of a ball, such as angle, orientation and speed, the ROI detection logic 210 estimates a location of the ball within the studio space, wherein the estimated location corresponds to a position within captured images by two or more cameras at a given time. Thus, the ROI detection logic 210 determines a region of interest being a portion of the captured images having the highest probability of containing the ball.

Following the determination of the region of interest for a set of images, system logic, e.g., object recognition logic 211, performs operations to analyze the region of interest of the images in order to detect and identify a ball. Once the ball is detected and identified, system logic, e.g., triangulation logic 212, performs a triangulation process to determine a location of the ball in 3D space using two captured images in which the ball was identified (block 408). The object recognition data and the triangulated location of the ball along with the captured images and a corresponding timestamp (collectively "ball-tracking data") may be stored in, for example, the image acquisition repository 216.

Upon determination of a triangulated location of the ball, the ROI detection logic 210 in combination with the triangulation logic 212 determines a subsection of subsequent images having the highest probability of containing the ball (block 410). In some embodiments, following the determination of a triangulated location of the ball in multiple (e.g., three) pairs of captured images, the ROI detection logic 210 utilizes the triangulated locations to estimate a subsection of a subsequently captured image having the highest probability of containing the ball. In such embodiments, prior to the determination of the triangulated location of the ball in multiple captured images, the ROI detection logic 210 continues determination of the subsection of each captured image having the highest probability of containing the ball using the launch parameters and known configuration of the cameras.

Further in some embodiments when the set of captured images for a given time does not contain the ball (or the ball otherwise goes unidentified), the ROI detection logic 210 may revert to using the launch parameters of the ball to estimate the subsection of subsequent captured images having the highest probability of containing the ball (until a triangulated location of the ball is identified for a predetermined number of captured images, e.g., three).

Referring now to FIG. 4B, the method 400 continues through the detection of a player in captured images. In such an instance, system logic, e.g., the triangulation logic 212, determines which two images to use for a triangulating the location of the player by selecting the two images that include the largest Euclidean distance between the ball and the player (block 414). In some embodiments, determining the images having the largest Euclidean distance between the ball and the player may include performing object recognition at a low resolution to identify an object resembling a ball and an object resembling a human. In some embodiments, the low resolution may be 320×240 pixels; however, in other embodiments, "low resolution" may refer to a resolution lower than the resolution used to triangulate the location of the ball in other operations discussed here. Performing the image segmentation at a reduced resolution provides the technical advantage of reducing processing power. Additional description of operations comprising determination of the Euclidean distance is provided in U.S. patent application Ser. No. 16/686,003, filed Nov. 15, 2019, titled "System and Method for a User Adaptive Training and Gaming Platform," the disclosure of which is hereby incorporated herein by reference in its entirety.

The camera pair that captured the two selected images is identified such that subsequent images captured by the camera pair will be utilized in continued tracking of the ball. Specifically, the method 400 continues to track the ball as the ball travels back toward the screen (wall, etc.), such as the screen 102 of FIGS. 1A-1C, and away from the player through triangulation of subsequently obtained image pairs (block 416). For example, the interaction between the player and the ball is captured, and each object (ball and player) is identified.

In embodiments in which an object-tracking system is applied to soccer ("football" in the UK), such as illustrated in FIGS. 1A-2, a player 116 typically receives a ball 114 launched from the ball-launching machine 105 positioned behind the screen 102, performs some interaction with the ball 114 (e.g., trap and touch), and kicks the ball 114 back toward the screen 102 (e.g., at a virtual goal that is displayed on the screen 102).

As is discussed herein, the entire sequence of the ball traveling toward the player, the player receiving and interacting with the ball, and the ball returning toward the screen is captured by the plurality of cameras positioned about the studio space. Further, system logic determines a location of the ball (and optionally the player) within 3D space of the playing surface 110 of FIGS. 1A-1C through triangulation using a pair of images. Thus, the ball is tracked by the system from the time it is initially identified following launch to when it is received by the player and as it travels away from the player toward the screen 102.

As the ball is continually tracked as discussed above, the system logic, e.g., the triangulation logic 212, determines when the ball is within a predetermined distance from the screen 102. In such an instance, the coordinate determination logic 216 performs processing on the triangulated location using a ballistic trajectory equation to determine coordinates of the screen 102 that the ball is expected to hit (block 418). In some embodiments, the coordinate determination logic 216 is initiated when the triangulation logic 212 determines that the ball is 75 cm away from the screen 102. In other embodiments, the coordinate determination logic 216 is initiated when the triangulation logic 212 determines that the ball is 60 cm away from the screen 102. However, the distance of the ball away from the screen at which the coordinate determination logic 216 is activated is configurable prior to runtime.

In addition to the configuration of the plurality of cameras utilized in tracking the ball, the lighting equipment of the studio space 100 is specifically configured to provide sufficient light to the playing surface 110 (e.g., approximately 350-400 lux) while also providing a dark surface at least on the screen 102 to increase the visibility of the projected or displayed image thereon (e.g., approximately 5-8 lux). As should be understood, images captured by the plurality of cameras (cameras 1-8, where cameras 7-8 are discussed below) of well-lit areas (e.g., 350-400 lux) are better suited for analysis by the logic of the object tracking system 200 when identifying the ball, player and/or other object. However, in contrast, the projection or display of the visual image on at least the screen 102 appears best in poorly lit areas (e.g., 0-8 lux). Thus, the lighting equipment of the studio space 100 (not shown) is specifically configured to provide a dimly lit area proximate the screen 102 (e.g., approximately 60-75 cm in front of the screen 102 of approximately 5-8 lux) and a well-lit area for the playing surface 110 (e.g., approximately 350-400 lux).

Still referring to FIG. 4B, following the determination of the coordinates of the screen at which the ball is expected to hit, instructions may be generated and transmitted to the projector (or other display module) that cause the rendering of a visualization on the screen based on the determined coordinates (block 420). In some embodiments, the instructions are transmitted after a predetermined time-delay or include a time-delay. Such embodiments provide a solution for the situation in which the coordinates are determined prior to the ball 114 traveling approximately 60-75 cm to contact the screen 102 such that the time-delay enables the rendering of the visualization to be fluid and in sync with the ball 114 contacting the screen. In some instances, the time-delay is predetermined while in other embodiments, the time-delay may be determined during run-time based on the speed of the ball 114 when the ball 114 is approximately cm away from the screen 102.

As non-limiting examples, the visualization may include a ball being shot passed a goalie indicating a goal was scored by the player or a ball being stopped by the goalie. However, as noted above, the visualizations provided need not correspond directly to a representation of a sporting event but may instead include fanciful or imaginative gameplay such as a ball extending into the screen to break up a meteor approaching the screen or knock over a zombie displayed on the screen. The gameplay illustrated on the screen may take on any embodiment.

c. Auxiliary Systems

In addition to the object-tracking as discussed above, the logic of the object-tracking system 200 may further analyze the captured images to detect objects such as a player 116 in a proximal portion of the playing surface 110 relative to the screen 102, multiple balls on the playing surface 110 or in a gutter 106, additional players on the playing surface 110, and/or particular body positions of the player 116, as will be discussed below. As used herein, the term "proximal portion" is intended to mean a portion of the playing surface 110 relative to a particular point, e.g., the proximal portion of the playing surface 110 relative to the screen 102 is intended to mean the portion is the portion of the playing surface 110 that is near the screen 102. In contrast, the term "distal portion" is intended to mean a portion of the playing surface 110 that is away from a relative point (i.e., further from the relative point than the proximal portion).

Figure 5:
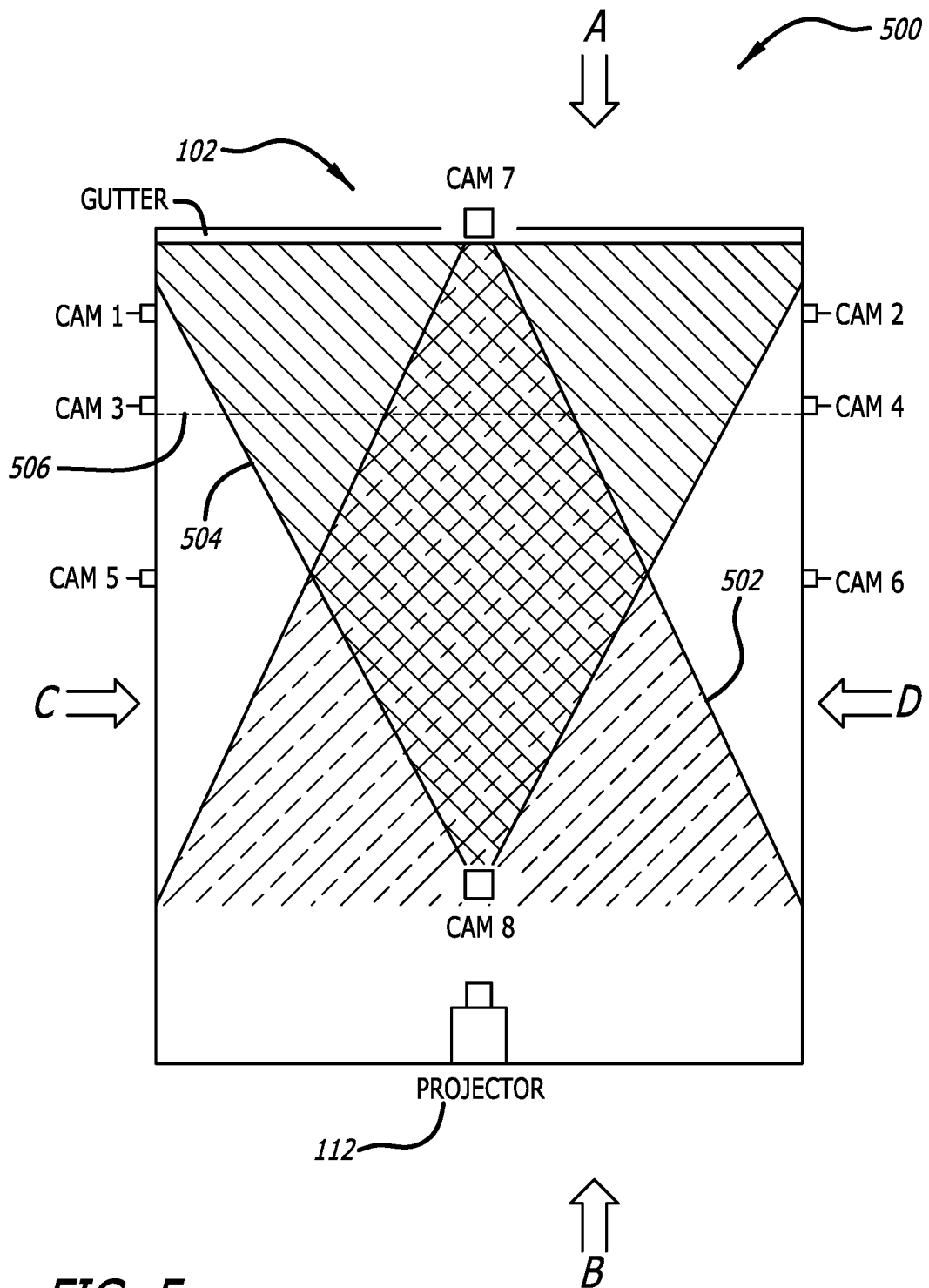
FIG. 5 is a top-down view of the studio space of FIG. 1A illustrating the field of view of an additional pair of time-synchronized cameras that are optionally included within the plurality of time-synchronized cameras of FIGS. 1A-1C in accordance with some embodiments.

In some embodiments, when a player is detected in a proximal portion of the playing surface 110 relative to the ball launching machine 205, the object recognition logic 211 may transit an instruction to the ball launching machine 205 to pause or stop the current session. Other warnings may be provided as well such as an audible or visual queue instructing the player 116 to move further back relative to the screen 102 (such may be provided to a central control center so that an administrator or supervisor may also pause or cancel the session). As is shown in FIG. 5, a line 506 (which may be referred to as a "do not cross" line) may segment the playing surface 110 into a proximal portion and a distal portion relative to the ball launching machine 205. In some embodiments, the line 506 may be visible to the player (e.g., placed physically or projected on the playing surface 110). In other embodiments, the line 506 may just be used in processing by the logic of the object tracking system 200 and not be visible to the player 116.

In some embodiments, when multiple balls on the playing surface 110 or in a gutter 106, the object recognition logic 211 may transit an instruction to the ball launching machine 205 to pause or stop the current session. For example, the object recognition logic 211 may detect a plurality of balls on the playing surface due to mishits by the player 116, or otherwise, such that the balls have not gone into gutter 106 for collection and placement within a queue or hopper to be launched. In some embodiments, when a predetermined number of balls is detected on the playing surface 110, e.g., five (5), the object recognition logic 211 may transit an instruction to the ball launching machine 205 to pause or stop the current session. Additionally, warnings, either audible or visual, may be generated that instruct the player 116 to gather the balls and place them in the gutter 106. In some embodiments, when multiple players on the playing surface 110, the object recognition logic 211 may transit an instruction to the ball launching machine 205 to pause or stop the current session; however, in some embodiments, multiple players are expected to be on the playing surface 110.

Further, particular body positions of the player 116 may be detected by logic, such as the human pose estimation logic 604, described below. In some embodiments, detection of certain body positions may trigger or initiate operations such as the transmission of an instruction to the ball launching machine 205 to pause or cancel the session or initiation of a process to generate a replay video by the replay generation logic 602, described below.

With respect to detection of objects within the gutter 106, specific operations are performed given the amount of light provided to the area directly in front of the screen 102, where the gutter 106 is located (see FIG. 1A). As referenced above, the area in front of the screen 102 where the gutter 106 is located may be poorly lit with approximately 5-8 lux. Thus, object recognition is a complex process due to the poor quality of images captured of the gutter 106. Illustrated in FIG. 5, cameras in addition to the cameras 1-6 may be included in some camera configurations such as cameras 7-8, which will be discussed more below. With respect to detection of objects within the gutter 106, the object recognition logic 211 may analyze images captured by cameras 1 and 2 to determine whether a threshold number of balls, or any foreign object(s), are located within the gutter 106. In some embodiments, upon receipt of the captured images from cameras 1 and 2, the images are manipulated to increase the exposure and brightness to overcome the lack of illumination. For example, in some situations, a jam may occur at the opening 108 such that a number of balls accumulate within the gutter 106. First, as accumulated balls within the gutter 106 are not moving, triangulation is not needed. Second, the object recognition logic 211 may increase contrast and brightness levels of the images of the gutter and perform object recognition to identify a number of balls in the gutter 106. When the number of balls within the gutter 106 at a given time reaches a threshold number, e.g., seven (7), the object recognition logic 211 may transit an instruction to the ball launching machine 205 to pause or stop the current session. Warnings may be provided as well such as an audible or visual queue instructing the player (or other facility personnel) to clear the blockage of balls within the gutter 106.

IV. General System Architecture—Replay and Human Pose Estimation

Referring now to FIG. 5, a top-down view of the studio space of FIG. 1A illustrating the field of view of an additional pair of time-synchronized cameras that are optionally included within the plurality of time-synchronized cameras of FIGS. 1A-1C is shown in accordance with some embodiments. FIG. 5 illustrates a top-down view of a studio space similar to that of FIGS. 1A-1C with the inclusion of a plurality of replay cameras, where the plurality of replay cameras comprises a replay camera system. The embodiment illustrates a 2-camera replay system; however, additional replay cameras may be utilized. Each replay camera is time synchronized and calibrated along with the cameras of the object-tracking system. Thus, system logic stores calibration data for the 2-camera replay system that enables projection of bounding boxes of a player determined through analyses of images captured by the object-tracking system on to images captured by the 2-camera replay system. The technical advantages of such will be discussed further below with respect to the human pose estimation operations.

The 2-camera replay system includes a first camera, camera 7, that is positioned above the screen (and typically above the center point) with a field of view facing toward the player (e.g., toward the second end). The 2-camera replay system additionally includes a second camera, camera 8, that is positioned above the playing surface of the studio (and typically above a position at which the player stands) with a field of view facing toward the screen (e.g., toward the first end). The camera 7 captures images of the player at, for example, a frame rate of 30 frames/second with each image having a high resolution (e.g., 5 MP). The camera 8 also captures images at a frame rate of 30 frames/second with each image having an identical resolution as camera 7. The camera 8 is positioned to capture images of the screen.

V. Logical Representation—Replay and Human Pose Estimation

Referring to FIG. 6, an exemplary embodiment of a logical representation of an object-tracking system including replay logic and human pose estimation logic is shown in accordance with some embodiments. The object-tracking system 600 includes the plurality of cameras of FIG. 5 (e.g., cameras 1-8), many of the same logic modules as discussed with respect to FIG. 2, and also includes a replay generation logic 602 and a human pose estimation logic 604.

Processing of the replay generation logic 602 may triggered in various manners, which may include, for example via manual input from a bystander, automatically in response to a goal scored and/or in response to detection of certain poses of the player. As will be discussed below, the replay generation logic 602 may receive data from the human pose estimation logic 604 indicating a particular pose of the player (e.g., hands extending above his/her head indicating a celebration). Specifically, the replay generation logic 602, when executed by the one or more processors 203, performs operations to obtain a series of images captured by the cameras 7-8, determine a location of the ball within the studio space through processing the series of images as discussed above with respect to FIGS. 4A-4B (optionally, in combination with the triangulation logic 212 and/or the ROI detection logic 210), determine the ball's location relative to a particular point in the studio space, select a series of images from either camera 7 or camera 8 depending on the ball's location, and generate a video ("a replay video") from the series of images. In some embodiments, the replay generation logic 602 may utilize images from both of the cameras 7-8 in generating the replay video.

The human pose estimation logic 604, when executed by one or more of the processors 203, performs operations to obtain images captured by cameras 1-8, obtain ball-tracking data as generated by the triangulation logic 212 and/or the ROI detection logic 210 indicating a location of the ball and a player, when applicable, within the images captured by the cameras 1-6, segment the player and the ball in the images captured by the cameras 1-6 to generate a bounding box around the player, utilize epipolar geometry to project the bounding box onto a set of images captured by one or more of cameras 7-8, perform a human pose estimation on the images captured by the cameras 7-8 to identify points of the player's body, determine player-ball interaction statistics (such as a touch sequence and/or dwell time) and optionally provide a human pose estimation to the replay generation logic 602.

VI. Operational Flow—Replay Functionality

Figure 7:
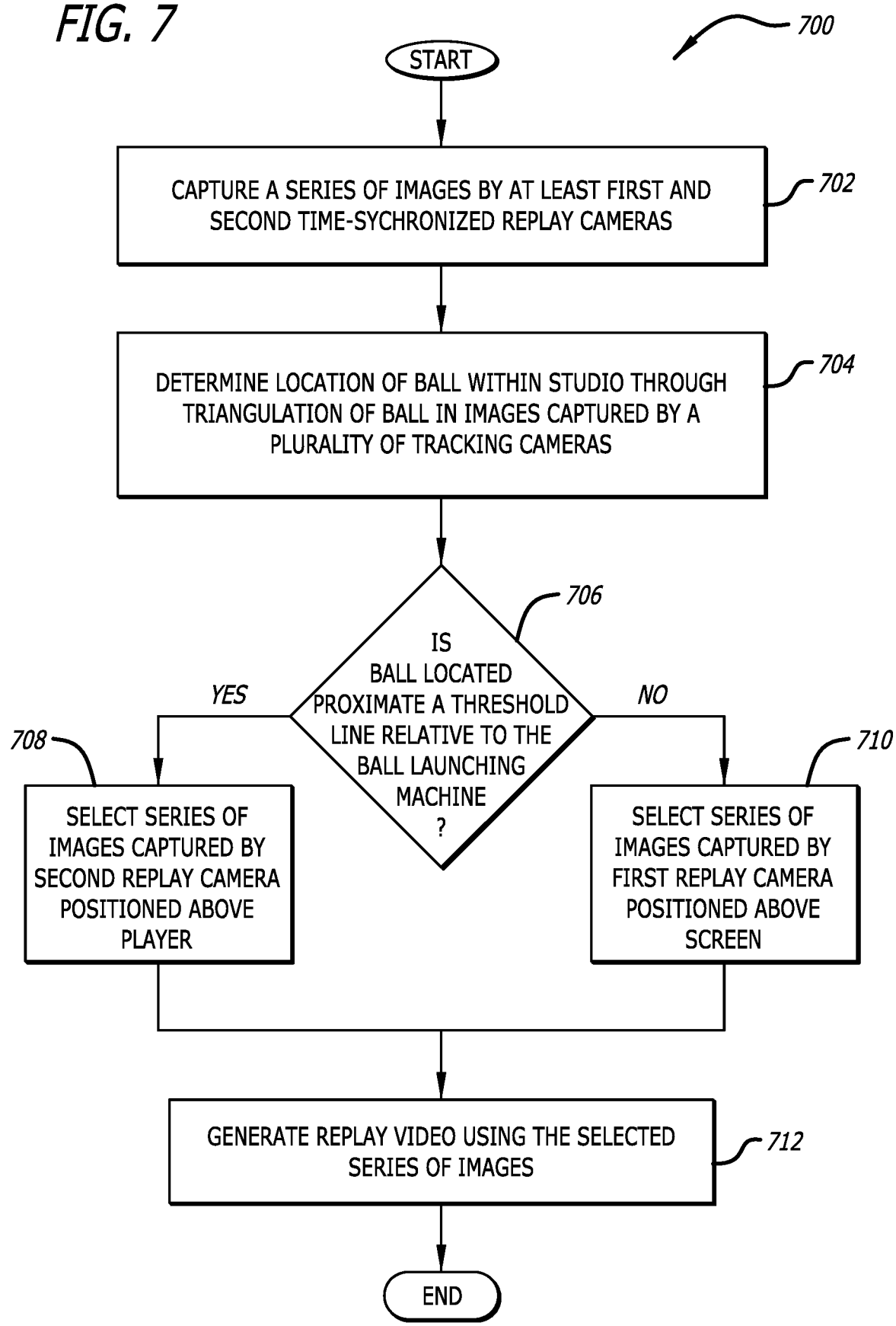
FIG. 7 illustrates a flowchart illustrating an exemplary replay generation method using the additional pair of time-synchronized cameras of FIG. 5 and the replay logic of FIG. 6 in accordance with some embodiments.

Referring to FIG. 7, a flowchart illustrating an exemplary replay generation method using the additional pair of time-synchronized cameras of FIG. 5 and the replay logic of FIG. 6 is shown in accordance with some embodiments. Each block illustrated in FIG. 7 represents an operation performed in the method 700 performed by an object-tracking system, such as the object-tracking system 600 of FIG. 6. It should be understood that not every operation illustrated in FIG. 7 is required. In fact, certain operations may be optional to complete aspects of the method 700. The discussion of the operations of method 700 may be done so with reference to any of FIGS. 1A-6.

The assumptions that were discussed with respect to FIGS. 3-4B are assumed to have occurred prior to the initiation of the method 700. An additional assumption that is to occur prior to the initiation of the method 700 is the performance of the method 700 with respect to cameras 1-8. The method 700 includes an operation of capturing a series of images by at least cameras 7-8 of FIG. 5, which as noted above are time-synchronized (block 702). The method 700 further includes determining a location of a ball within the studio space through triangulation of the ball as identified in the images captured by the cameras 1-6 (block 704).

Based on the location of the ball within the studio space, a determination is made as to whether the ball is located proximate a threshold line relative to the ball launching machine 105 (or screen 102) (block 706). When the ball is located proximate the threshold line (yes at block 706), the method 700 includes an operation of selecting a series of images captured by camera 8 (block 708). When the ball is not located proximate the threshold line (no at block 706), the method 700 includes an operation of selecting a series of images captured by camera 7 (block 710). Following selection of a series of images, the method 700 includes an operation of generating a replay video using the selected series of images (block 712). The replay video may be stored be stored in the profile repository 220 in association with the player's profile.

In certain embodiments, the generation of a replay video may be triggered based on particular situations within the session such as a particular number of goals scored (e.g., where a threshold number of goals are scored and the session ends, where a replay video is generated on the final goal scored). Various other configurable scenarios have been contemplated to trigger generation of a reply and are within the scope of this disclosure including, but not limited or restricted to, detection of a particular pose by the player (using the human pose estimation logic 604), detection of a particular touch sequence, etc.

VII. Operational Flow—Human Pose Estimation

Figure 8:
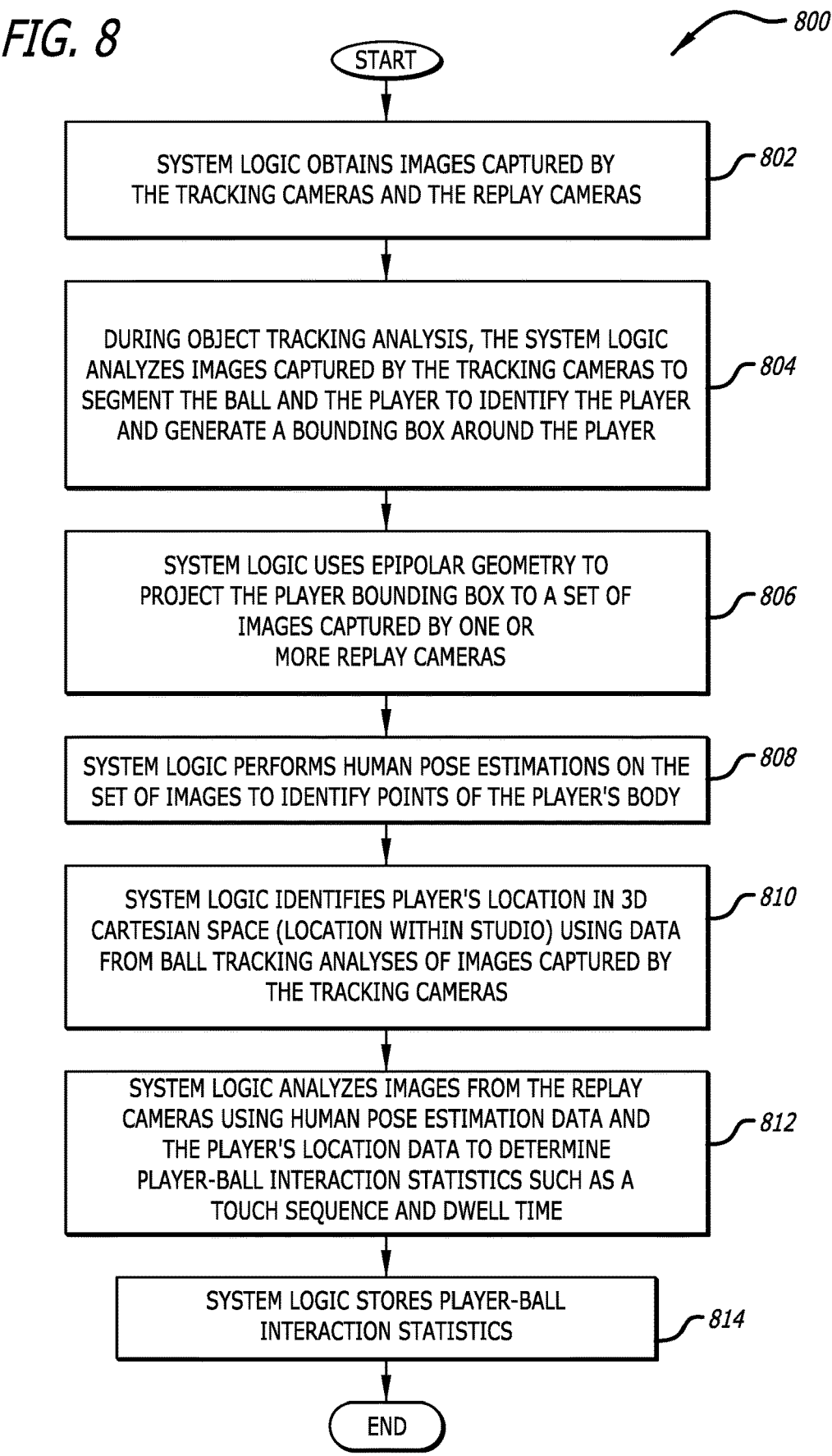
FIG. 8 is a flowchart illustrating an exemplary human pose estimation method using at least two of the time-synchronized cameras of FIG. 5 and the human pose estimation logic of FIG. 6 in accordance with some embodiments.

Referring now to FIG. 8, a flowchart illustrating an exemplary human pose estimation method using at least two of the time-synchronized cameras of FIG. 5 and the human pose estimation logic of FIG. 6 is shown in accordance with some embodiments. Each block illustrated in FIG. 8 represents an operation performed in the method 800 performed by an object-tracking system, such as the object-tracking system 600 of FIG. 6. It should be understood that not every operation illustrated in FIG. 8 is required. In fact, certain operations may be optional to complete aspects of the method 800. The discussion of the operations of method 800 may be done so with reference to any of FIGS. 1A-6.

The assumptions that were discussed with respect to FIGS. 3-4B are assumed to have occurred prior to the initiation of the method 800. An additional assumption that is to occur prior to the initiation of the method 800 is the performance of the method 300 with respect to cameras 1-8. The method 800 includes an operation, performed by the human pose estimation logic 604 when executed by one or more processors, of obtaining images captured by the object-tracking system 600 of FIG. 6 including the cameras 1-8 (block 802).

Further, the method 800 may include an operation, performed by the human pose estimation logic 604, when executed by one or more of processors, of obtaining ball-tracking data as generated by the triangulation logic 212 and/or the ROI detection logic 210, where the ball-tracking data indicates a location of the ball and a player, when applicable, within the images captured by the cameras 1-6 (block 804). Based on the ball-tracking data, the human pose estimation logic 604 segments the ball from the player to identify the player and generate a bounding box around the player. The segmentation of the ball and player may be performed in the same manner as discussed above with respect to FIG. 4B Based on the ball-tracking data and the bounding box, the human pose estimation logic 604, when executed by one or more of processors, utilizes epipolar geometry to project the bounding box around the player onto each image of the set of images captured by at least one of cameras 7-8 (block 806). The human pose estimation logic 604 is able to project to the bounding box generate from images of the cameras 1-6 onto images of the cameras 7-8 as each of the cameras 1-8 are included in the calibration process discussed above. Specifically, the calibration process of FIG. 3 includes the cameras 7-8, when the cameras 7-8 are included within the studio space.

Utilizing the bounding boxes projected onto the images captured by the cameras 7-8, the human pose estimation logic 604, when executed by one or more of processors, performs operations comprising a human pose estimation to identify points of the player's body (e.g., hand, elbow, shoulder, head, torso, knee, foot, etc.) (block 808). Following identification of points of the player's body, the human pose estimation logic 604, when executed by one or more of processors, performs operations to identify the player's location in the studio from the ball-tracking data obtained from the triangulation logic 212 and/or the ROI detection logic 210 (block 810).

Further, the human pose estimation logic 604, when executed by one or more of processors, analyzes the images captured by one or more of the cameras 1-8 along with the identified points of the player's body to determine player-ball interaction statistics (block 812). In some preferred embodiments, the human pose estimation logic 604 analyzes the images captured by one or more of the cameras 1-7. Some examples of the player-ball interaction statistics may include, but are not limited or restricted to, a touch sequence of the ball by the player ("touch sequence") and dwell time. A touch sequence may refer to a number of touches of the ball by the player and/or an indication of which points of the player's body touched the ball. Dwell time may refer to the duration of the time from receipt of the ball (e.g., a player's first touch) to release of the ball (e.g., a player's last touch). The player-ball interaction statistics may be stored in, for example, the profile repository 220, in association with a specific player.

Optionally, not shown, the human pose estimation logic 604 may, when executed by one or more of processors, determine an estimated human pose based on, for example, comparison or correlation against known human poses, and provide an indication of the estimated human pose to the replay generation logic 602, which may trigger initiation of operations to generate a replay video.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A computerized method for object tracking and human pose estimation, the method comprising:
    obtaining a sequence of images from a first plurality of cameras, wherein the first plurality of cameras are time-synchronized and disposed around a playing space in a mirrored configuration, wherein the mirrored configuration includes a first subset of the plurality of cameras disposed on a first side of the playing space and a second subset of the cameras disposed on a second half of the playing space, the second side opposite the first side;
    repeatedly performing operations of:
    detecting an object in a set of images captured by either the first subset of the plurality of cameras or the second subset of the first plurality of cameras,
    determining a current location of the object within the playing space through triangulation of the object within the set of images as the object travels away from a launch point, toward a destination point, and back toward the launch point, and
    detecting a person within at least a subset of the set of images; and
    performing a human pose estimation procedure resulting in a set of detected points of the person; causing rendering of a visual graphic based on the wall coordinates.

2. The computerized method of claim 1, further comprising:
    generating a bounding box around the person in the at least subset of set of images.

3. The computerized method of claim 2, further comprising:
    obtaining a second sequence of images from a second plurality of cameras that are time-synchronized with the first plurality of cameras, wherein a first camera of the second plurality of cameras is positioned above the launch point, and wherein a second camera of the second plurality of cameras is positioned above the playing space having a field of view facing toward the launch point.

4. The computerized method of claim 3, further comprising:
    projecting the bounding box to a subset of the second sequence of images captured by any of the second plurality of cameras.

5. The computerized method of claim 3, further comprising:
    identifying a location of the person within the playing space in the set of images captured by either the first subset of the plurality of cameras or the second subset of the plurality of cameras.

6. The computerized method of claim 1, further comprising:
    correlating the set of detected points of the person against known human poses resulting in a determination of a first pose of the person in a captured image of the subset of the set of images.

7. The computerized method of claim 6, further comprising:
    responsive to detection of the first pose, initiating a replay generation sequence including generating a video from a series of captured images.

8. A computing device, comprising:
    a processor; and
    a non-transitory computer-readable medium having stored thereon instructions that, when executed by the processor, cause the processor to perform operations including:
    obtaining a sequence of images from a first plurality of cameras, wherein the first plurality of cameras are time-synchronized and disposed around a playing space in a mirrored configuration, wherein the mirrored configuration includes a first subset of the plurality of cameras disposed on a first side of the playing space and a second subset of the cameras disposed on a second half of the playing space, the second side opposite the first side;

repeatedly performing operations of:

detecting an object in a set of images captured by either the first subset of the plurality of cameras or the second subset of the first plurality of cameras, determining a current location of the object within the playing space through triangulation of the object within the set of images as the object travels away from a launch point, toward a destination point, and back toward the launch point, and detecting a person within at least a subset of the set of images; and performing a human pose estimation procedure resulting in a set of detected points of the person.

9. The computing device of claim 8, wherein the operations further include:

generating a bounding box around the person in the at least subset of set of images.

10. The computing device of claim 9, wherein the operations further include:

obtaining a second sequence of images from a second plurality of cameras that are time-synchronized with the first plurality of cameras, wherein a first camera of the second plurality of cameras is positioned above the launch point, and wherein a second camera of the second plurality of cameras is positioned above the playing space having a field of view facing toward the launch point.

11. The computing device of claim 10, wherein the operations further include:

projecting the bounding box to a subset of the second sequence of images captured by any of the second plurality of cameras.

12. The computing device of claim 10, wherein the operations further include:

identifying a location of the person within the playing space in the set of images captured by either the first subset of the plurality of cameras or the second subset of the plurality of cameras.

13. The computing device of claim 8, wherein the operations further include:

correlating the set of detected points of the person against known human poses resulting in a determination of a first pose of the person in a captured image of the subset of the set of images.

14. The computing device of claim 13, wherein the operations further include:

responsive to detection of the first pose, initiating a replay generation sequence including generating a video from a series of captured images.

15. A non-transitory computer-readable medium having stored thereon instructions that, when executed by one or more processors, cause the one or more processor to perform operations including:

obtaining a sequence of images from a first plurality of cameras, wherein the first plurality of cameras are time-synchronized and disposed around a playing space in a mirrored configuration, wherein the mirrored configuration includes a first subset of the plurality of cameras disposed on a first side of the playing space and a second subset of the cameras disposed on a second half of the playing space, the second side opposite the first side;

repeatedly performing operations of:

detecting an object in a set of images captured by either the first subset of the plurality of cameras or the second subset of the first plurality of cameras, determining a current location of the object within the playing space through triangulation of the object within the set of images as the object travels away from a launch point, toward a destination point, and back toward the launch point, and detecting a person within at least a subset of the set of images; and performing a human pose estimation procedure resulting in a set of detected points of the person.

16. The non-transitory computer-readable medium of claim 15, wherein the operations further include:

generating a bounding box around the person in the at least subset of set of images.

17. The non-transitory computer-readable medium of claim 16, wherein the operations further include:

obtaining a second sequence of images from a second plurality of cameras that are time-synchronized with the first plurality of cameras, wherein a first camera of the second plurality of cameras is positioned above the launch point, and wherein a second camera of the second plurality of cameras is positioned above the playing space having a field of view facing toward the launch point.

18. The non-transitory computer-readable medium of claim 17, wherein the operations further include:

projecting the bounding box to a subset of the second sequence of images captured by any of the second plurality of cameras.

19. The non-transitory computer-readable medium of claim 17, wherein the operations further include:

identifying a location of the person within the playing space in the set of images captured by either the first subset of the plurality of cameras or the second subset of the plurality of cameras.

20. The non-transitory computer-readable medium of claim 15, wherein the operations further include:

correlating the set of detected points of the person against known human poses resulting in a determination of a first pose of the person in a captured image of the subset of the set of images, and responsive to detection of the first pose, initiating a replay generation sequence including generating a video from a series of captured images.

* * * * *